Dec. 6, 1960

P. S. SIZER 2,963,089

FLOW CONTROL APPARATUS

Filed March 7, 1955

Phillip S. Sizer
INVENTOR.

BY
Browning, Simms & Hyer

ATTORNEYS

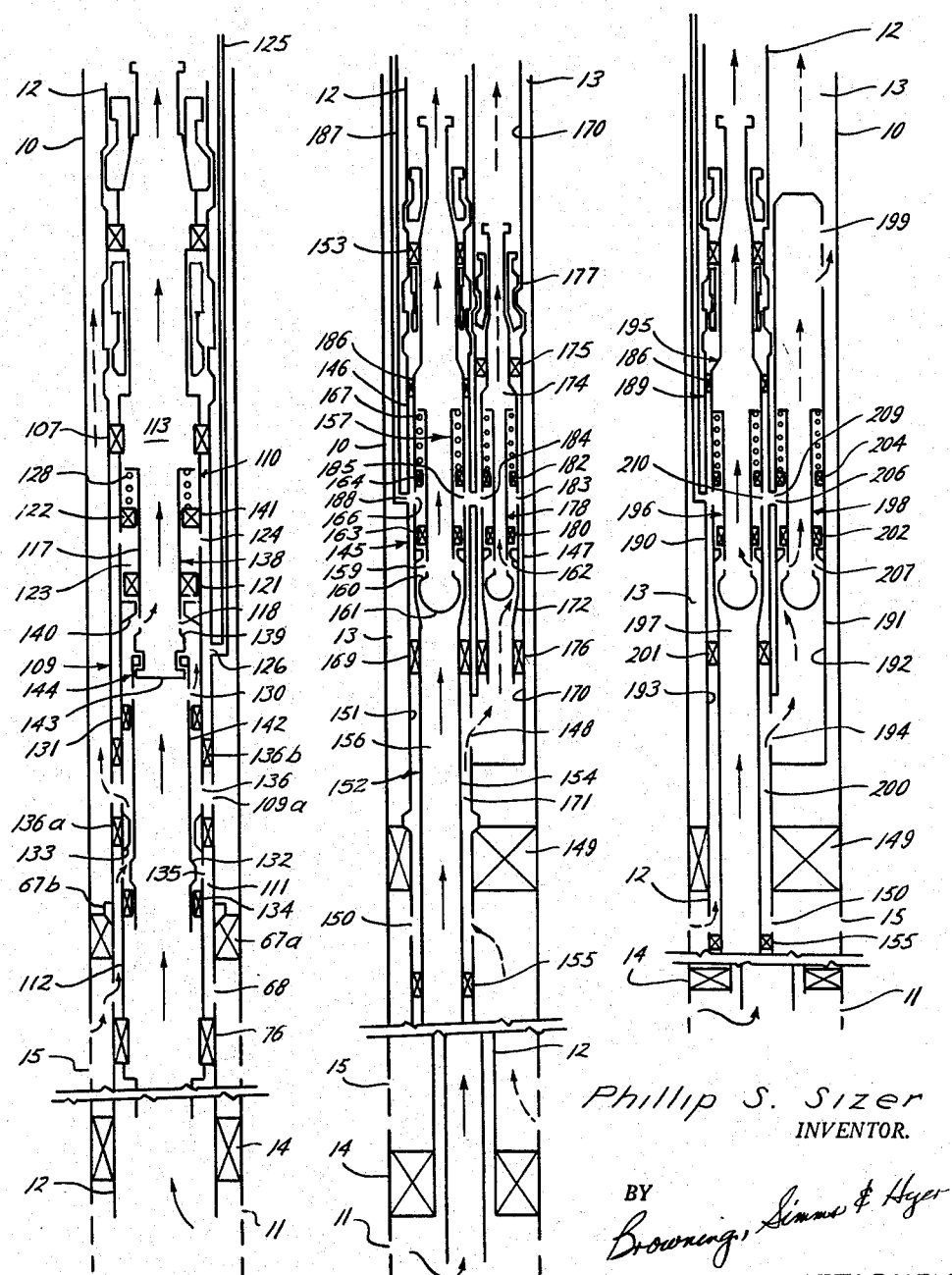

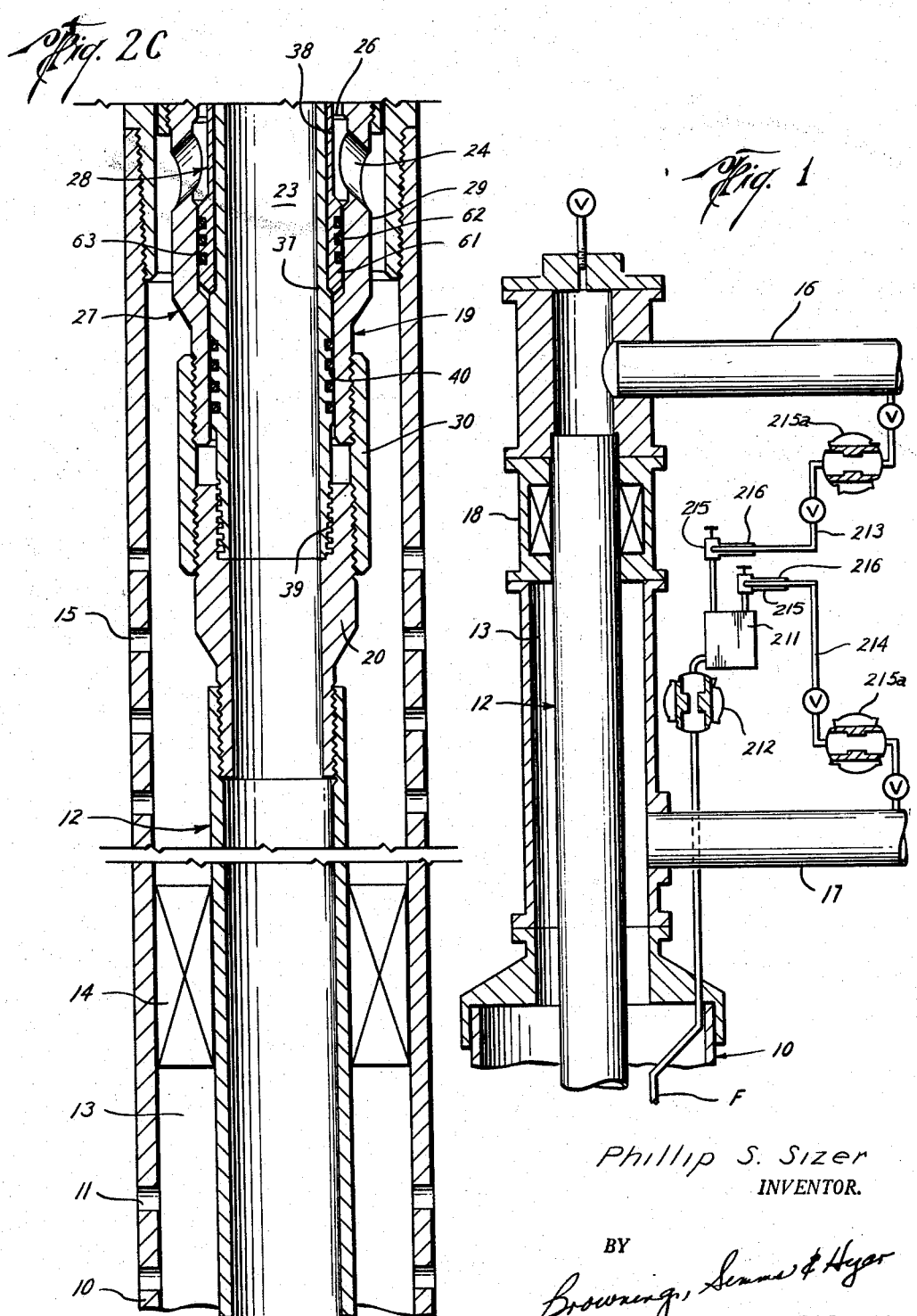

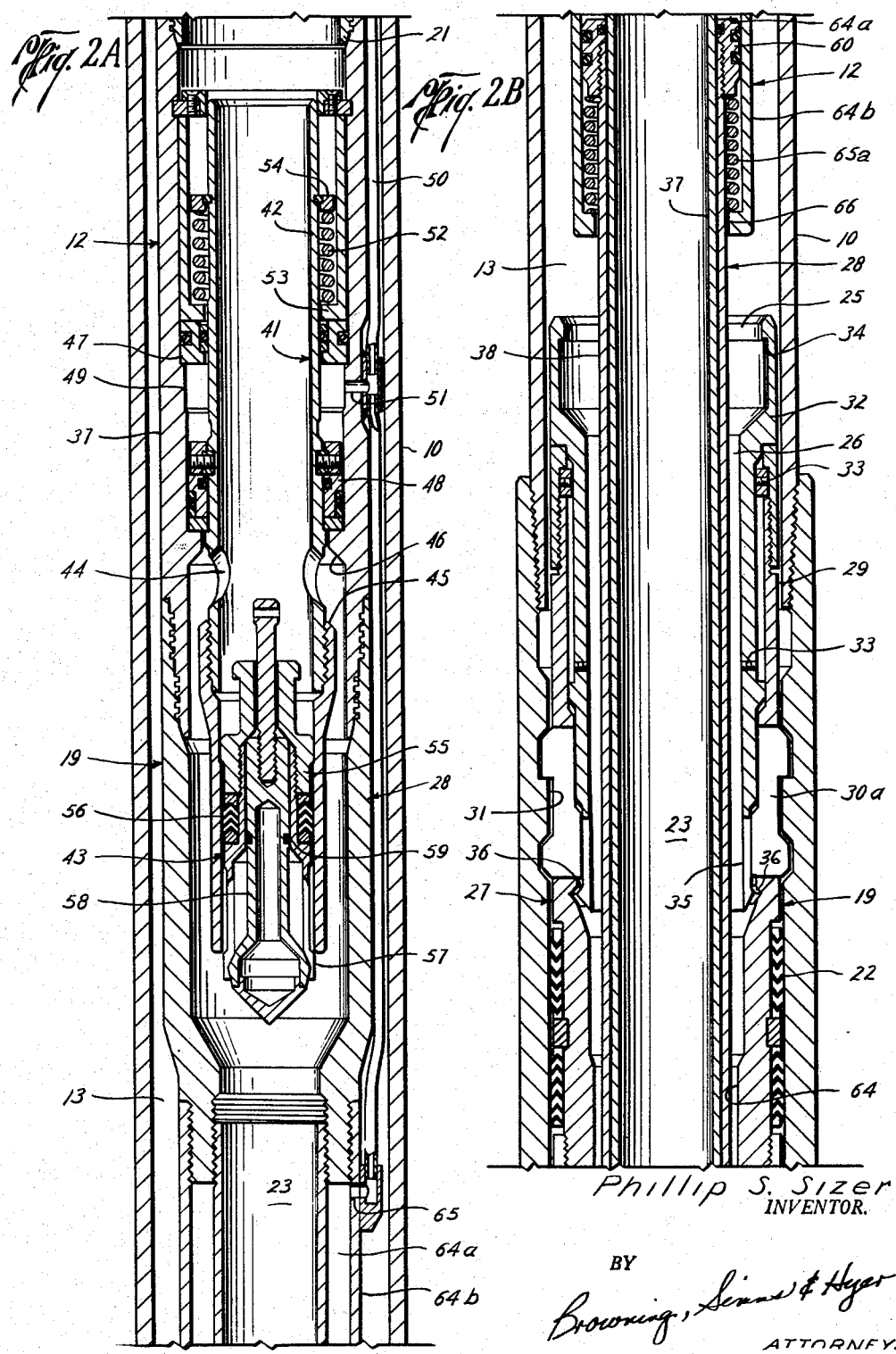

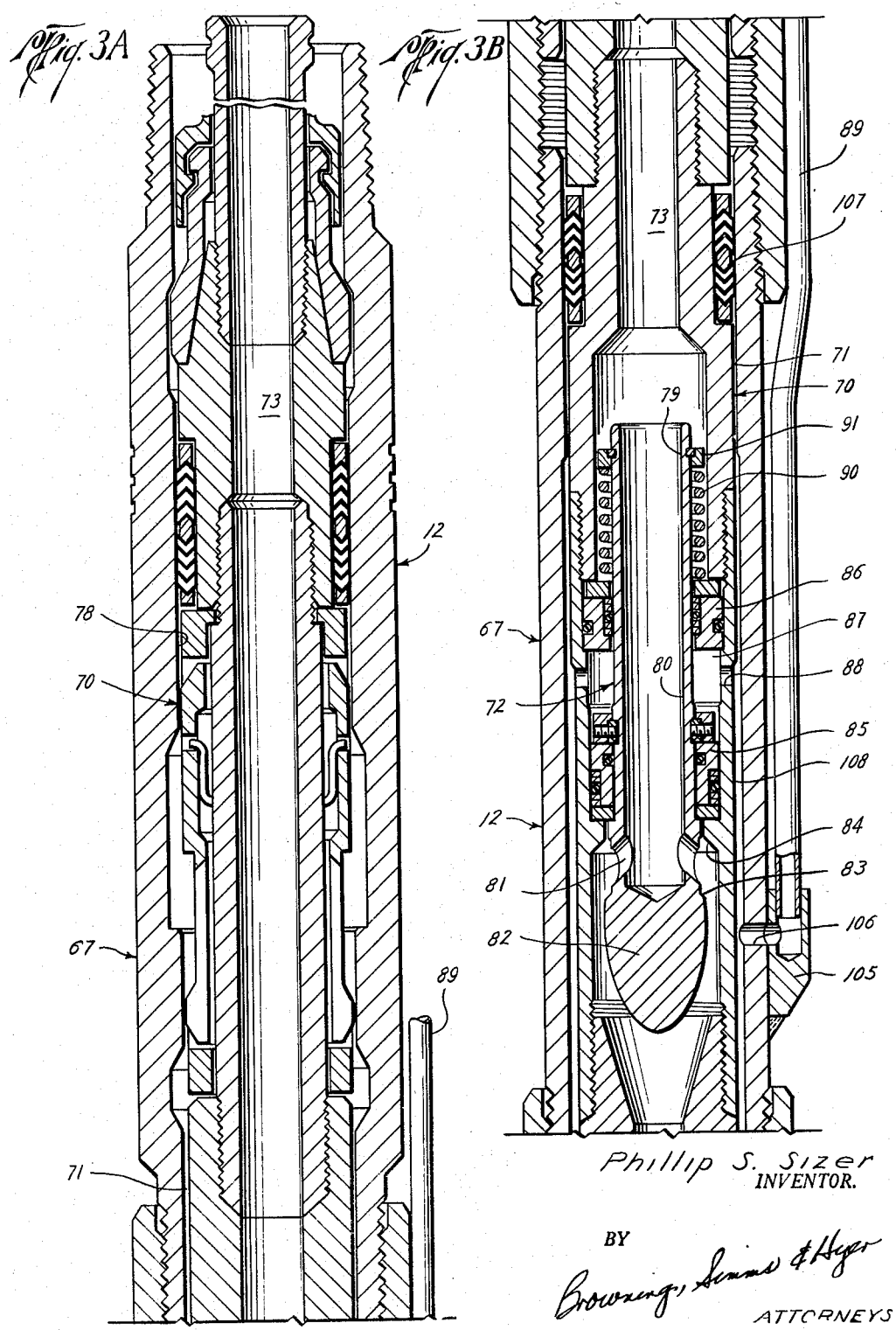

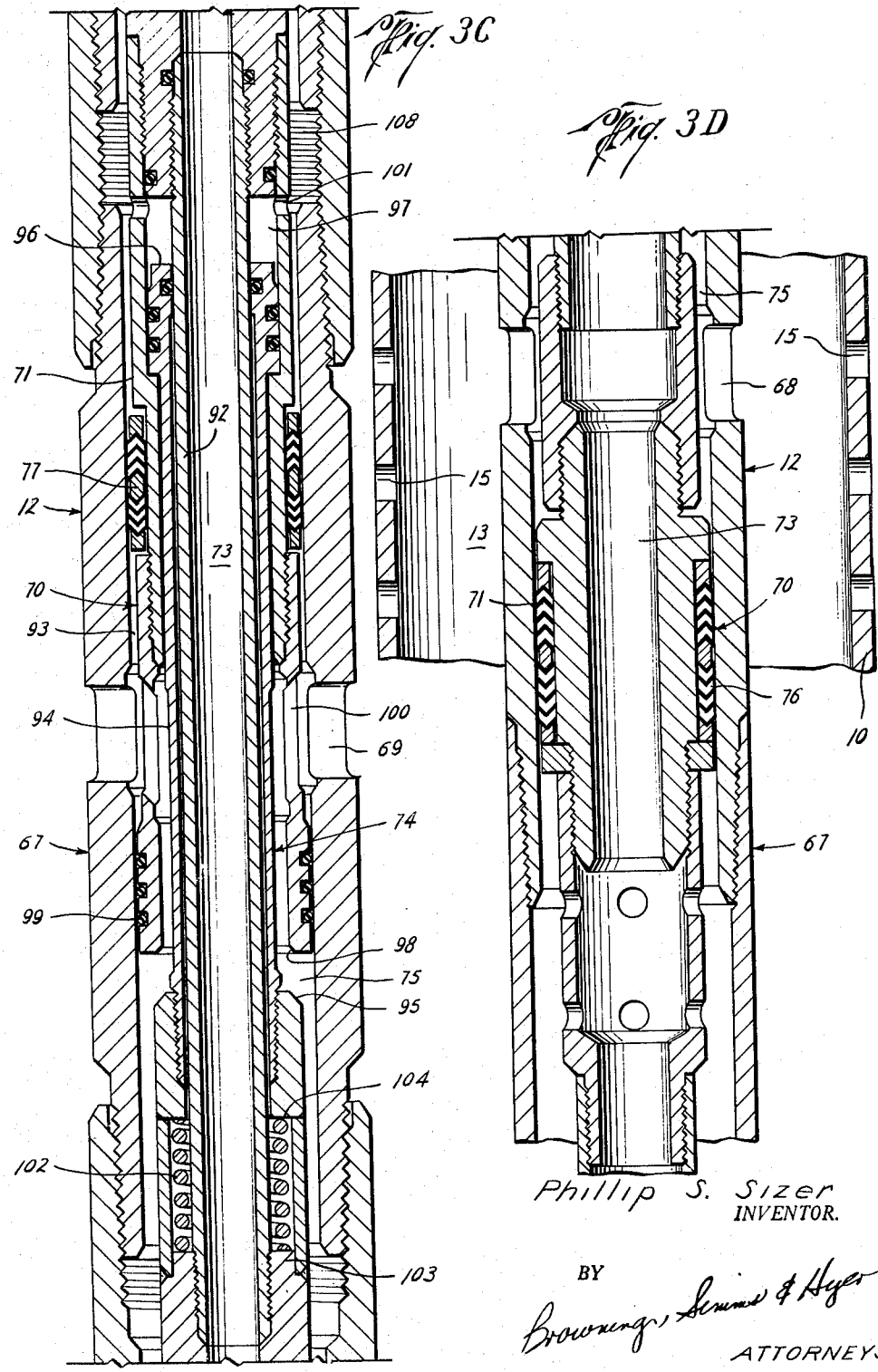

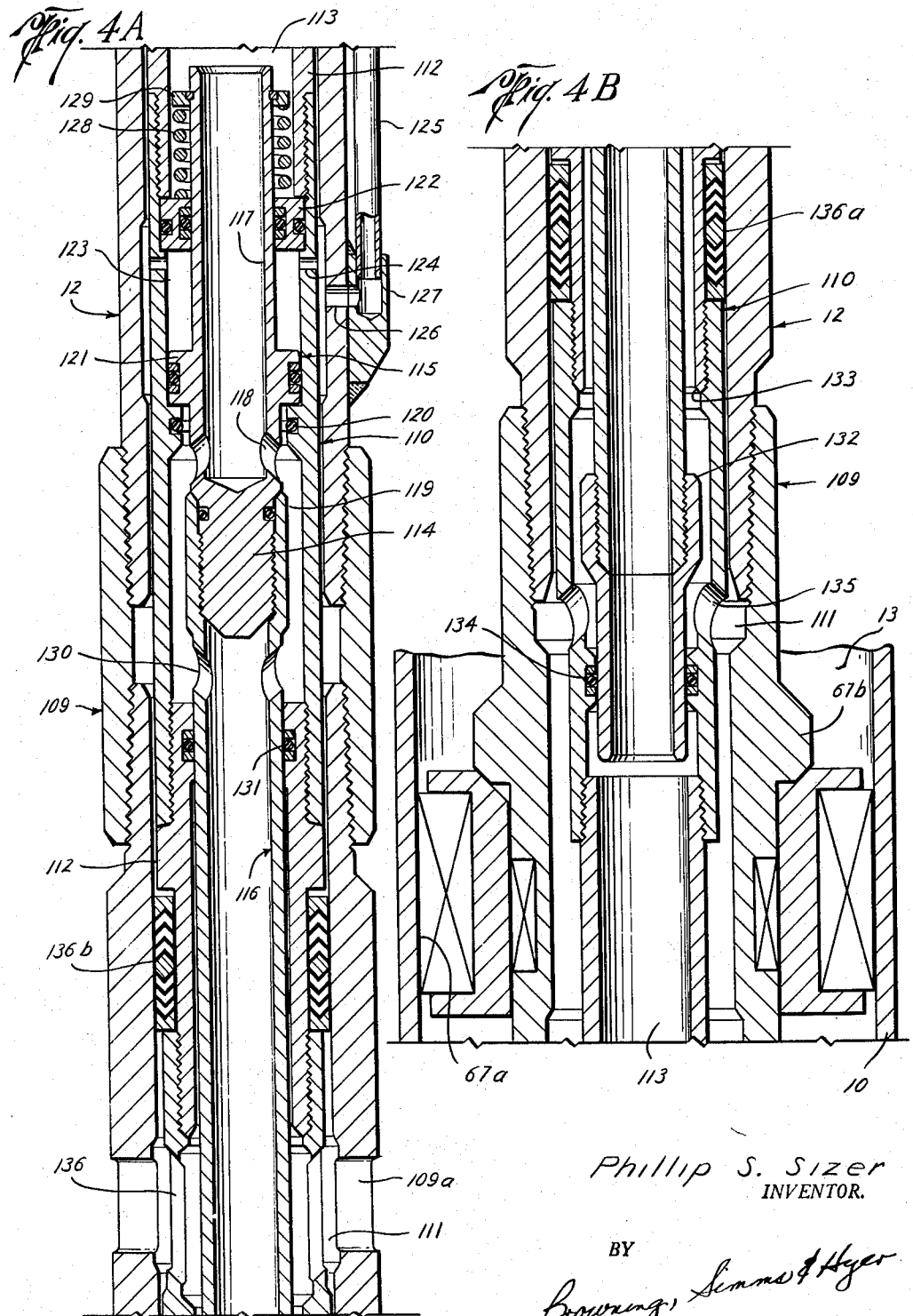

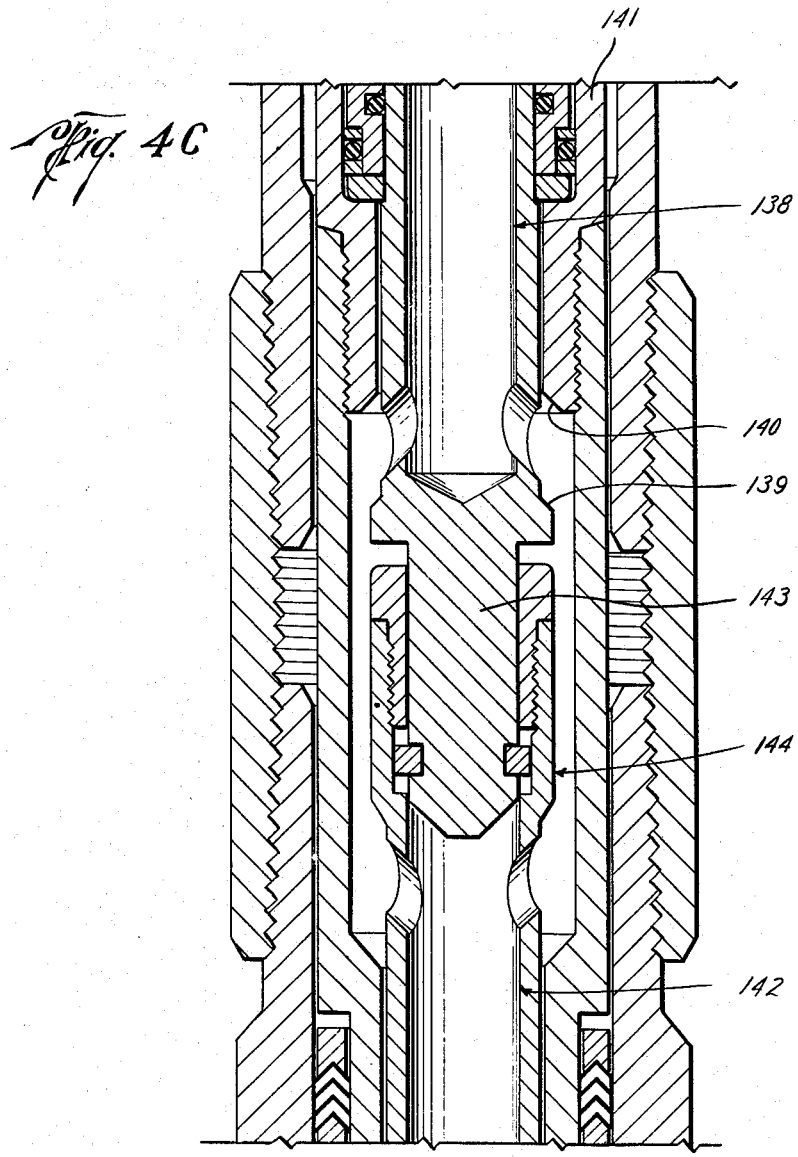

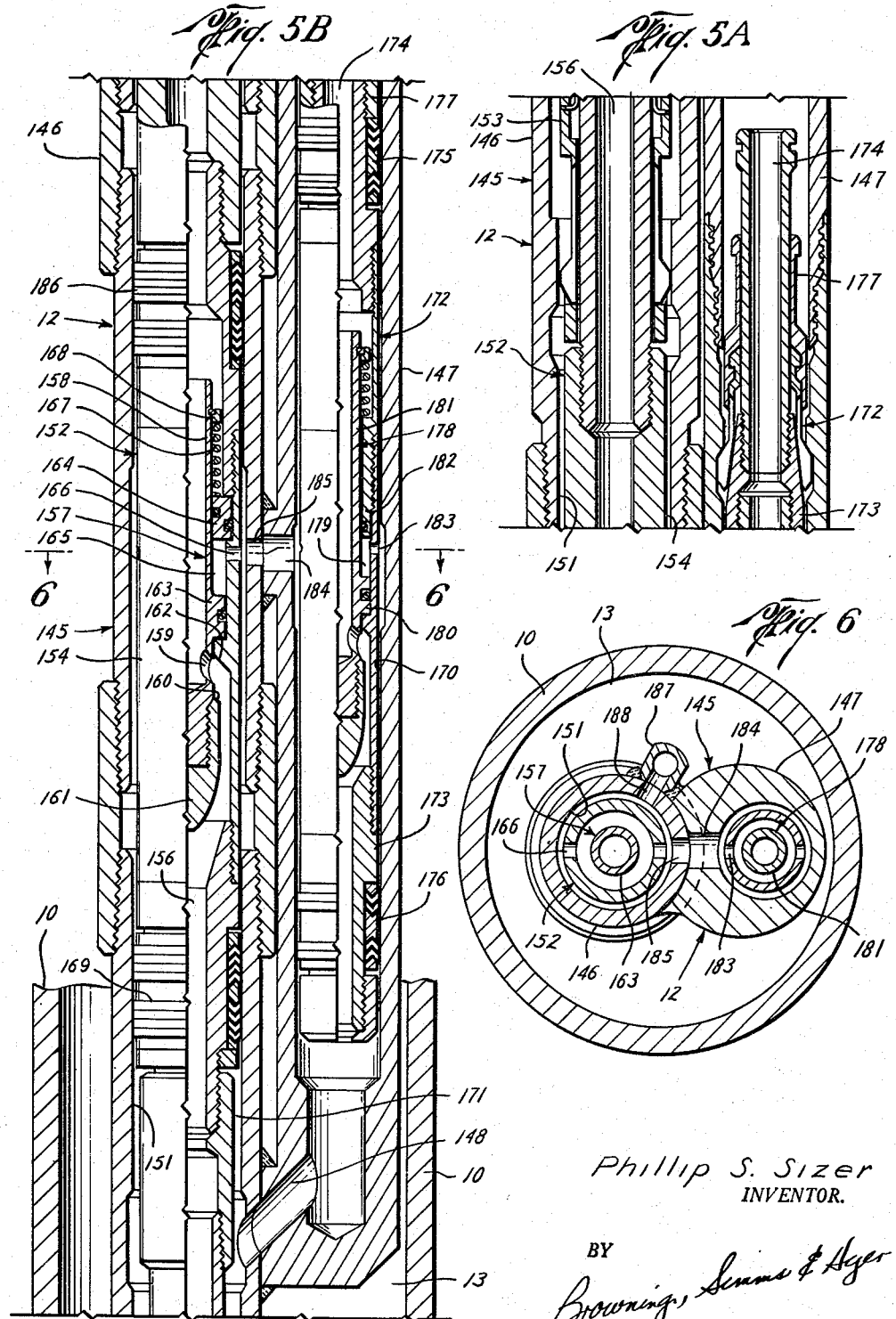

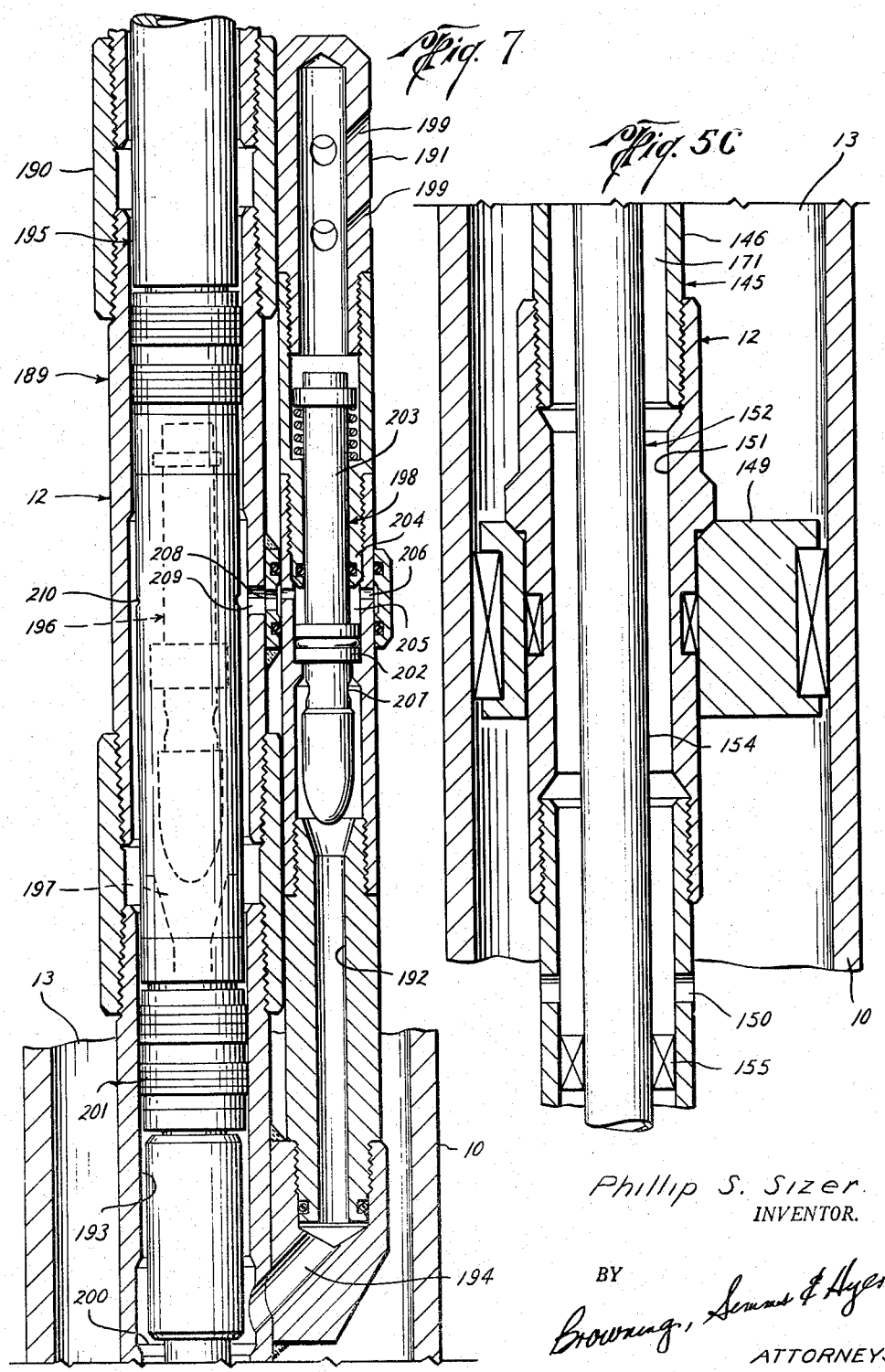

United States Patent Office 2,963,089
Patented Dec. 6, 1960

2,963,089

FLOW CONTROL APPARATUS

Phillip S. Sizer, Dallas, Tex., assignor to Otis Engineering Corporation, Dallas, Tex., a corporation of Texas Filed Mar. 7, 1955, Ser. No. 492,527

25 Claims. (Cl. 166—72)

This invention relates to novel apparatus for controlling production flow at a subsurface level within a two-zone well. In one of its aspects, it relates to such apparatus which is of special utility in permanently completed two-zone wells.

In another of its aspects, this invention relates to such apparatus for use in a two-zone well having a conventional flow pattern wherein lower zone production is flowed through the tubing and upper zone production through the tubing-casing annulus. When so used, this apparatus provides a means for exerting such subsurface control over flow from one or both of said zones from a point remote from the subsurface level and, more particularly, from ground level. This apparatus is also usable as a safety device within a conventionally flowed two-zone well for automatically shutting off flow at the subsurface level from one or both of said zones in response to a predetermined change in pressure conditions within the well above such level.

The flow control apparatus of the present invention is an improvement over an earlier flow control apparatus wherein was provided apparatus for controlling flow through a well tubing from a single production zone. Such apparatus was conceived for the purpose of solving many problems also encountered in the control over production from two-zone wells. For example, there is the problem of providing safety control over production flow in the case of damage or destruction to the well equipment. Also, it is highly desirable to provide a remote control over such flow in order that wellhead equipment may be repaired. Still further, it may be desired to control production flow within a permanently completed well such that provision must be made for a substantially full opening through the well tubing to accommodate the passage of well tools and the like for work-over operations on the lower zone.

Previous attempts have been made at providing subsurface safety valve control for shutting off the production flow from the upper as well as the lower zone of permanently completed two-zone wells, such control being automatically responsive to damage of the well above the subsurface level. For example, in the permanent completion installation shown on page 204 of the March 1954 issue of World Oil, a conventional safety valve may be attached to the lower end of a cross-over tool for controlling flow within a well tubing over lower zone production, and another such valve may be connected in the tubing string above the crossover tool to provide control over upper zone production.

Such conventional types of safety valve are not only objectionable from the standpoint of flow restriction, but also they are not adaptable to remote control. Still further, however, an arrangement such as described above necessitates the crossing over of flow from the lower and upper zone production. Many instances arise in which it is necessary or very desirable to produce the two zones in conventional or straight flow fashion.

It is, therefore, an object of this invention to provide apparatus in a two-zone well for controlling flow at a subsurface level from each of said production zones without crossover.

Another object is to provide apparatus having control means operable at ground level for preventing or permitting flow at a subsurface level from each zone of a two-zone well.

Another object is to provide valve means disposable at a subsurface level within a conventionally flowed two-zone well and operable in response to a predetermined pressure change within the well above said subsurface level for shutting off production flow from each of said zones.

A further object is to provide improved apparatus for controlling flow from the upper or both the upper and lower zones of a permanently completed and conventionally flowed two-zone well at a subsurface level within the well.

Still another object is to provide in a two-zone well, in which lower zone production is flowed through the tubing and upper zone production through the tubing-casing annulus, apparatus connectable as a part of the tubing at a subsurface level within the well and including valve means operable to shut off flow from the upper zone in response to a predetermined pressure change in the well above such subsurface level.

A still further object is to provide in a two-zone well, in which lower zone production is flowed through the tubing and upper zone production through the tubing-casing annulus, apparatus adapted to be connected in the tubing string at a subsurface level within the well and including separate passageways for flow from each of said zones, the passageway for upper zone production having valve means which is operable from a control means at ground level for opening or closing the same to flow therethrough.

A still further object is to provide apparatus including valve means at a subsurface level within a conventionally flowed two-zone well for permitting or shutting off flow from the upper zone, which valve means is hydraulically operable from a source of fluid situated at ground level and connected to the valve means by a flow line extending within the tubing-casing annulus.

Yet a further object is to provide apparatus of the character described in the foregoing object in which the valve means is hydraulically operable to permit or shut off flow from both zones.

A still further object is to provide apparatus disposable within a well conduit and providing valve control over two separate passageways through the conduit, in which one passageway extends substantially coaxially of the conduit and the valve control for such coaxial passageway is movable at least in part to permit the passage through said passageway of well tools and the like runnable through the conduit.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a diagrammatic view of the upper end of a two-zone well, showing control equipment at ground level having fluid communication with the tubing and the tubing-casing annulus and connected to a flow line extending downwardly in the annulus;

Figs. 1A, 1B, 1C, 1D and 1E are schematic sectional views of illustrative embodiments of the subsurface apparatus of the present invention which are connected as part of the well tubing within a well casing;

Figure 1A:
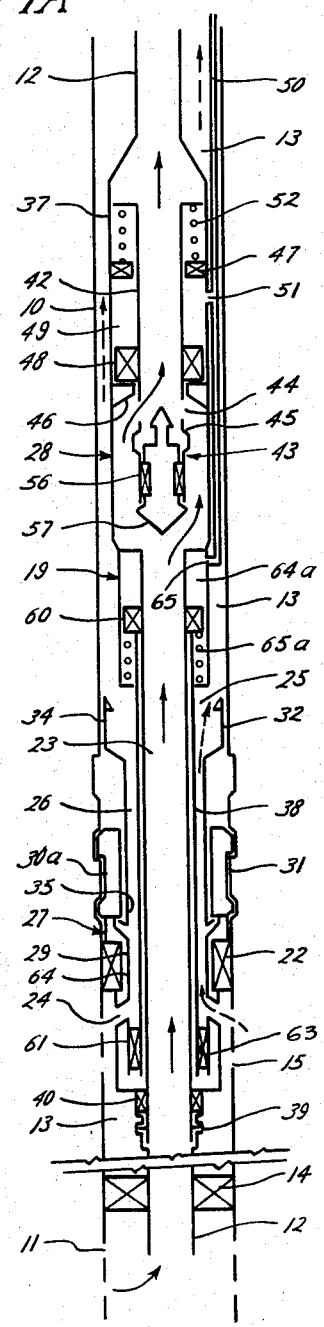
Figure 1B:
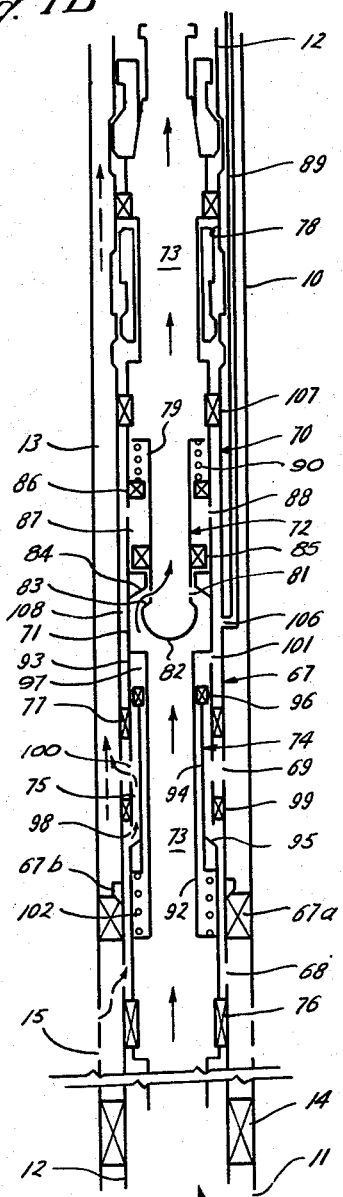

Figs. 2A, 2B, and 2C are successive detailed sectional views of the Fig. 1A embodiment;

Figs. 3A, 3B, 3C, and 3D are detailed sectional views illustrating parts of the Fig. 1B embodiment;

Figs. 4A and 4B are detailed sectional views of portions of still another embodiment of the subsurface apparatus of the present invention, which is a slight modification of the Fig. 1C embodiment;

Fig. 4C illustrates a portion of the Fig. 1C embodiment;

Figs. 5A, 5B, and 5C are detailed sectional views of portions of the Fig. 1D embodiment;

Fig. 6 is a cross-sectional view of the above embodiment, taken substantially along broken line 6—6 of Fig. 5B; and Fig. 7 is a detailed sectional view of portions of the Fig. 1E embodiment of the subsurface apparatus of the present invention.

Fig. 1 illustrates the well head equipment and shows a well casing 10 having a tubing string 12 therein. The well head equipment in Fig. 1 is used with each of the five embodiments of the invention shown schematically in Figs. 1A, 1B, 1C, 1D, and 1E. Each of these schematic illustrations shows a particular valve assembly connected in the tubing string 12 to control flow therethrough and to control the flow through the annulus between the tubing string 12 and casing 10.

The valve assembly shown schematically in Fig. 1A is illustrated in detail from top to bottom successively in Figs. 2A, 2B and 2C. The portion of Fig. 2C below the break line of the drawing illustrates the disposition of the lower packer 14, packing off between the tubing string 12 and casing 10, as used in all the five embodiments shown in Figs. 1A–1E.

The details of the valve assembly shown schematically in Fig. 1B are illustrated from top to bottom in Figs. 3A, 3B, 3C and 3D respectively. This particular valve assembly is connected in the tubing string 12 and related to the casing 10 as shown in Fig. 1B, and the lower packer 14 of Fig. 1B is shown in Fig. 2C.

The details of the valve assembly shown schematically in Fig. 1C are illustrated from top to bottom in Figs. 4A, 4B and 3C respectively. Again, this valve assembly is connected in tubing string 12 and disposed in casing 10 as illustrated schematically in Fig. 1C. The lower packer 14 of Fig. 1C is shown in the lower portion of Fig. 2C.

Fig. 4C illustrates a slight modification of the valve assembly shown schematically in Fig 1C. Fig. 4C is an enlarged view of, and may be substituted for, the middle portion of Fig. 4A.

The details of the valve assembly shown schematically in Fig. 1D are illustrated from top to bottom in Figs. 5A, 5B and 5C respectively. As above, this valve assembly is connected in tubing string 12 and disposed in casing 10 as schematically illustrated in Fig. 1D, and the lower packer 14 of Fig. 1D is shown in the lower portion of Fig. 2C.

The details of the valve assembly shown schematically in Fig. 1E are illustrated from top to bottom in Figs. 7 and 5C respectively. As above, this valve assembly is connected in tubing string 12 and disposed in casing 10 as schematically illustrated in Fig. 1E, and the lower packer 14 of Fig. 1E is shown in Fig. 2C.

There is illustrated in connection with each of the embodiments of the present invention a two-zone well, in which a casing 10 extends, as shown in Fig. 1, from ground level to a subsurface level at which it communicates through ports 11 with a lower production zone of the well, as shown, for example, in Fig. 2C as well as in each of the schematic views of Figs. 1A, 1B, 1C, 1D and 1E. Extending within the casing is a well tubing 12 which is spaced from the casing to provide a tubing-casing annulus 13 and packed off by a packer 14 above ports 11 in the casing but below ports 15 communicating with upper zone production so as to separate the two zones. As well known in the art, lower zone production is flowed upwardly through the tubing 12 to the wellhead at ground level from which it may be discharged through the flow wing 16, as shown in Fig. 1. Upper zone production, on the other hand, is flowed upwardly from the ports 15 through the tubing-casing annulus 13 to the wellhead, from which it is discharged through flow wing 17. The wellhead may include suitable valves, such as a blowout preventer or other fitting 18, providing a seal about the tubing 12. Inasmuch as this portion of the well forms no part of the invention, it is illustrated diagrammatically and in the most simple manner. Also, as will be understood from the description to follow, the Fig. 1D embodiment of the invention may require modifications to the wellhead, in a manner well known in the art.

In each embodiment of this invention, and subsurface apparatus thereof includes a housing connectable as a part of the tubing 12 and providing two separate passageways therethrough for upper and lower zone production. Thus, the housing includes a portion adapted to be packed off within the casing above the upper zone ports 15 to confine upper zone production into a passageway by-passing such housing packer and lower zone production into a passageway through the housing. Upon passage through the passageways, as shown by the solid and broken arrows of the schematic views, illustrating lower and upper zone production flow, respectively, the flow from both the upper and lower production zones is directed, respectively, back into or through the tubing-casing annulus 13 and the tubing 12 for passage to the wellhead.

Disposed within each of the passageways is a valve means for controlling flow therethrough. According to one aspect of this invention, the valve means for one or both of said production zones is automatically operable to shut off flow through the passageway for such production in response to a predetermined pressure change within the well above the subsurface level at which such valve means is disposed. According to another aspect of this invention, there is provided a source of fluid under pressure situated at ground level and having a connection with a flow line extending downwardly to the valve means through the tubing-casing annulus for hydraulically operating the valve means for one or both of the zones. In this manner, the subsurface control may be exerted from a point at ground level and, if desired, even more remote from the subsurface level than the wellhead.

According to a still further aspect of this invention, there is disposed substantially coaxially of the apparatus an opening which is substantially full opening so as to permit the passage therethrough of tools for work-over of the lower production zone, as is contemplated in the case of permanently completed wells. That is, the subsurface apparatus is especially well suited for use in a permanently completed two-zone well and, for that purpose, at least part of the valve means is movable in a manner to provide such an opening through the housing, which opening has a minimum diameter corresponding to the drift diameter of the tubing to which the housing is connected. In the preferred embodiments of the invention shown, this opening is provided by a valve means which is removable from the well at least in part upwardly through the tubing by wire line.

In embodiment shown schematically in Fig. 1A and in detail in Figs. 2A, 2B, and 2C, the housing is designated in its entirety by the numeral 19 and is connected as a part of the tubing 12 at its lower end by means of a sub 20 and at its upper end by means of any suitable connection 21 shown only in part in Fig. 2A. Carried by the housing 19 for sealing engagement with the casing 10 above upper zone communications 15 is a packer 22, shown in Fig. 2B.

As can be seen from Fig. 1A and the three Figs. 2A to 2C, a first passageway 23 is provided through the housing coaxially of the tubing to permit flow therethrough of lower zone production. Openings 24 are provided through the housing between the packers 14 and 22 and communicate with an opening 25 above the packer 22, as shown in Fig. 2B, by means of an annular passageway 26 between concentrically arranged portions of the housing to be described hereinafter. It will be understood that upper zone production by-passes the packer 22 as it flows from ports 15 and the annulus beneath packer 22 upwardly through ports 24 into the annular passageway 26 and outwardly into the tubing-casing annulus above packer 22 through openings 25 in the housing.

The concentrically arranged portions of the housing 19 comprise a locking and packing mandrel 27 and a valve carrying mandrel 28 received within the mandrel 27 in spaced relation thereto to define the afore-mentioned annular passageway 26. The locking and packing mandrel comprises a tubular member 29 upon which the packer 22 is carried, as shown in Fig. 2B, and through which the openings 24 and 25 are provided, as shown in Fig. 2C and Fig. 2B. The lower end of tubular member 29 is threadedly connected to sub 20 by a coupling 30 and the upper end thereof is provided with suitable means for releasably locking the mandrel 27 within the casing 10 in the position shown.

This locking means is shown particularly in Fig. 2B and comprises a series of radially movable locking parts or lugs 30a carried by tubular member 29 for cooperation with complementary recesses 31 within the casing. A locking and expanding ring 32 is releasably connected to the tubular member 29 by means of shear pins 33 such that when locking parts 30a are disposed opposite the recesses 31, the pins 33 may be sheared to permit locking ring 32 to be lowered with respect to tubular member 29 for expanding such parts into locking engagement with the recesses, as shown. For this purpose, the upper end of locking ring 32 is provided with a neck 34 to permit manipulation by a wire line tool and is slidably movable axially within tubular member 29 upon shearing of pins 33. The lower end of locking ring 32 is provided with a collet 35 which includes spring fingers having shoulders engageable in locked position beneath an oppositely facing shoulder 36 on tubular member 29 so as to retain the locking parts 30a in expanded and locking position.

The valve carrying mandrel 28 comprises a tubular member 37 threaded to connection 21 at its upper end and releasably connected at its lower end to the coupling 20 by means of square threads 39, as shown in Fig. 2C. Also, the member 37 carries O-rings 40 for sealing engagement with the tubular member 29 beneath the openings 24 so as to sealably enclose the lower end of passageway 26. It is obvious from the foregoing that the upper end of the tubing string 12 is removable with the mandrel 28 separately from the lower end thereof. It is also obvious that the mandrel 27 not only lands and locks the lower end of the string within the casing 10, but also seals off the annulus above the upper zone ports 15. Still further, the separate removal of tubular member 37 permits repacement and repair of flow line 50.

Carried within the upper end of tubular member 37 is a valve member for opening and closing the passageway 23 to flow therethrough. This valve is designated in its entirety by the numeral 41 and includes a tubular body portion 42 axially movable within tubular member 37 and a head 43 removably disposed within the central flow passage through the tubular body portion at a point beneath flow passages 44 and annular seat 45, as shown in Fig. 2A. The valve is shown in an open position such that lower production zone flow from ports 11 is into the lower end of tubing 12, through passageway 23, and into the valve through flow passages 44. It will be understood, however, that upon upward movement of the valve member 41, the valve seat 45 will sealably engage with oppositely facing seat 46 on the tubular member 37 to close passageway 23 to flow therethrough.

That portion of tubular member 37 which provides the casing for the valve member 41 is provided with a pressure responsive part 47 which provides in connection with a pressure responsive part 48 carried by valve member 41 a variable capacity pressure chamber 49. Furthermore, a flow line 50 extends downwardly through tubing-casing annulus from the control system at ground level (Fig. 1), which is to be described hereinafter, and has a fluid connection with the pressure chamber 49 through an opening 51 in tubular member 37 of the valve carrying mandrel. Still further, a compression coil spring 52 is disposed between a shoulder 53 upon the casing portion of tubular member 37 and an oppositely facing shoulder 54 carried by the body portion of movable valve member 41. Thus, the valve member is urged to a closed position by the resilient force of the spring 52 while hydraulic means, in the form of fluid under pressure conducted downwardly into variable capacity chamber 49 through flow line 50, is provided for urging the valve member to an open position, as it is shown in Fig. 2A.

It can be seen from Fig. 2A that the central flow passage through body portion 42 of the valve member 41 corresponds to the drift diameter of the tubing 12 such that it is substantially full opening. Thus, removal of the head 43 of the valve member permits the passage through the apparatus of well tools and the like runnable through the tubing for work-over of the lower zone in permanently completed wells. The head 43 provides an imperforate barrier across the central valve flow passage at the lower end of body portion 42, which barrier is selectively landable within or removable from the well by wire line. For this purpose, the removable head comprises a main body portion 55 which carries a packer 56 sealable with the body portion 42 of the valve member and a collet 57 at its lower end having spring fingers for engagement with the lower end of said body portion, as shown in Fig. 2A. The spring fingers are held in locked position by means of an expander 58 axially movable with respect to the main body portion 55.

It is believed apparent from Fig. 2A that the head is removable upon downward movement of expander 58 relative to body portion 55 which permits the spring fingers of the collet 57 to be passed upwardly beneath the lower end of body portion 42. Suitable necks are provided upon the body and expander portions of the head such that it may be installed or removed by wire line in a manner described. O-rings 59 or other sliding seals carried between expander 58 and body portion 55 insure a fluid-tight seal across the head. Of course, equivalent valve means of a similar type may be used.

Referring now to the remainder of the valve means for the apparatus of Fig. 1A and the embodiment of Figs. 2A to 2C, and particularly that portion for controlling flow from the upper zone, a valve member 38 is slidable axially about inner tubular member 37 and is provided at its upper and lower ends, respectively, with pressure responsive means in the form of a piston 60 (Fig. 2B) and a sealing surface 61 (Fig. 2C). As will be explained in more detail hereinafter, this valve means for the flow of upper zone production is shown in an open position in which the O-rings 62 or other suitable sealing elements are engageable with sealing surface 63 of tubular member 29 beneath housing openings 24. Thus, in this open position of the valve means, upper zone production is permitted to flow through housing opening 24 and into passageway 26, from which it is returned to the tubing-casing annulus through housing opening 25. In the closed position, the sealing means 62 of the valve member is sealably engageable with sealing surface 64 (Fig. 2B) above opening 24 such that passageway 26 is closed to flow therethrough.

Movement of the valve member 38 between open and closed positions is provided by the piston 60 which, as shown in Fig. 2B, is part of a variable capacity pressure chamber 64a defined by an annular housing 64b secured about a reduced diameter portion of the tubular member 37 of mandrel 28. As shown in Fig. 2A, the flow line 50 is extended downwardly to connect with port 65 in the housing 64b such that the piston 60 is responsive to fluid under pressure within such flow line, similarly to pressure responsive member 48 of valve member 41. In the embodiment shown, both valve members are operable from the same hydraulic source, although it is obvious that separate flow lines from individual control systems may be extended to each of the variable capacity pressure chambers such that the valve members could be operated independently of one another.

It will also be noted that a compression coil spring 65a is disposed between a shoulder 66 on housing 64b and the lower end of piston 64a so that the valve member 61 is resiliently urged toward closed position. As in the valve means for the flow of lower zone production, the valve member 38 is urged toward open position by fluid under pressure conducted downwardly into the pressure chamber 64a through flow line 50. Of course, it will also be obvious that the interrelation of closing and opening of the valve members 41 and 61 may be controlled by the proper selection of coil springs. Thus, for example, one valve member may close upon a reduction of the pressure of the fluid to one amount and the other closed upon a still further reduction.

Although corresponding in its more basic aspects to the above-described embodiment of Fig. 1A and Figs. 2A to 2C, the embodiment shown schematically in Fig. 1B and in more detail in Figs. 3A to 3D illustrates an apparatus usable with the more common type of permanent completion installation. In this embodiment, the housing, designated in its entirety by the numeral 67, is composed of a single mandrel connectable at its upper end (Fig. 3A) to the upper portion of the tubing string and at its lower end (Fig. 3D) to a lower portion of the tubing string packed off within the casing by packer 14 beneath upper zone ports 15 but above lower zone ports 11, as shown schematically in Fig. 1B. An intermediate portion of the housing 67 is packed off within the casing above the ports 15 intermediate the lower end of Fig. 3C and the upper end of Fig. 3D, as shown by the packer 67a of Fig. 1A. As shown in more detail in Fig. 4B, the housing may be provided with a shoulder 67b for resting on the upper end of the packer. Openings 68 (Fig. 3D) are provided through the housing intermediate the upper and lower packers 67a and 14, while openings 69 (Fig. 3C) are provided through the housing above the upper packer, for purposes to be described.

The valve means for controlling the flow from the two production zones is carried within a tool removably lockable within the housing 67. This tool is designated in its entirety by the numeral 70 and is made up of a tubular body member 71 having a locking device at its upper end, as shown in Fig. 3A; valve means 72 (Fig. 3B) beneath the locking device and within a passageway 73 through body member 71 for controlling the flow of lower zone production; valve means 74 (Fig. 3C) movable within an annular passageway 75 between the body 71 and inner diameter of the housing 67 for opening and closing the same to flow therethrough of upper zone production; and packing means 76 (Fig. 3D) for sealing with said housing beneath the lower openings 68, as well as packing means 77 (Fig. 3C) for sealing above upper openings 69 so as to define the upper and lower limits of the annular passageway 75.

The locking device includes parts on the removable tool 70 cooperable with complementary parts, particularly recesses, in the housing portion of Fig. 3A in which said locking part is removably lockable. As shown, this locking device is similar in both construction and operation to that shown in Patent No. 2,673,614 to Miller such that a detailed description thereof is not required in this application. It is to be noted, however, that this type of landing device is particularly well adapted for use in a permanently completed well inasmuch as it permits a substantially full opening through the housing portion in which it is lockable. That is, the opening 78 through the upper housing portion of Fig. 3A, and having the recesses illustrated for cooperation with the expandable locking parts on the locking device, has a minimum diameter corresponding to the drift diameter of the tubing, such that, as discussed in connection with the previously described embodiment, well tools and the like runnable through the tubing may be passed through the flow control apparatus of this invention for workover of the lower production zone. In this connection, use of the particular locking device shown is important, although equivalent apparatus, providing a substantially full opening through the housing upon removal of the tool 70, may be used for the purpose of this aspect of the invention.

The valve means 72 movable within the first axial passageway 73 for controlling the flow of lower zone production is in many ways similar to the valve means 41 of Fig. 1A and the embodiment of Figs. 2A to 2C. That is, valve means 72 includes a tubular body portion 79 having a central flow passage 80 therethrough and movable axially within the portion of tubular member 71 which forms the casing for the valve means. Also, this valve means includes flow ports 81 through the tubular portion 79 and above a head member 82 and annular valve seat 83, the latter being seatable in the closed position of the valve means upon shoulder 84 of the casing portion of tubular member 71. It will be noted with respect to this embodiment of the invention, that inasmuch as the entire tool 70 is removable from the housing 67 for providing a substantially full opening therethrough, the head member 82 is not made removable from the tubular body of the valve means.

Similarly to the valve means for the flow of lower zone production of Fig. 1A and the embodiment of Figs. 2A to 2C, valve means 72 is provided with a pressure responsive element 85 cooperable with a similar pressure responsive element 86 on the casing portion of tubular member 71 to provide a variable capacity pressure chamber 87 therebetween. Fluid communication exteriorly of the pressure chamber 87 is provided by ports 88 which communicate with flow line 89 extending downwardly through the tubing-casing annulus 13. Further, a compression coil spring 90 is disposed between the upper end of pressure responsive means 86 on tubular member 71 and a shoulder 91 affixed to the upper end of the tubular body 79 of the valve means 72 such that the valve member is resiliently urged to a closed position. However, as will be apparent, the valve member is hydraulically urged to the open position shown in Fig. 3B by fluid under pressure conducted downwardly through flow line 89.

The portion of the tubular member 71 of the removable tool 70 beneath lower zone valve means 72, and shown in Fig. 3C, includes an inner reduced diameter portion 92 defining the passageway 73 through the tool and an outer cylindrical portion 93 arranged concentrically of and spaced from the reduced diameter portion 92 to provide an annular space therebetween. It will be noted, in this respect, that the packing means 77 is carried by outer cylindrical part 93.

The valve means 74 for controlling the flow of upper zone production comprises a tubular member 94 axially slidable over reduced diameter portion 92 of the tubular member 71. More specifically, this valve means 74 includes a tubular member 94 having a valve seat 95 formed on a shoulder at its lower end and a pressure responsive means at its opposite end in the form of a piston 96 operable within the annular space between tubular members 92 and 93 to provide a variable capacity pressure chamber 97 therein. The valve seat portion 95 of the valve member 94 is movable within the annular passageway 75 and is sealable with surface 98 of tubular member 93 for closing such passage to the flow of upper zone production therethrough. As previously stated, the packing means 76 and 77 below and above, respectively, housing openings 68 and 69 define the upper and lower limits of this annular passageway 75. O-rings 99 between the inner housing wall and the tubular member 93 and radially disposed ports 100 through said tubular member further define this sealed passageway.

Piston 96 is hydraulically operated by fluid under pressure introduced into the pressure chamber 97 through ports 101 within tubular member 93. A compression coil spring 102 is disposed between a shoulder portion 103 of the tubular member 71 and an oppositely facing shoulder 104 formed on the valve member 94 beneath seat 95, as shown in Fig. 3C. Thus, the valve means for upper zone production in this embodiment of the invention has characteristics similar to those of the valve means of the previously described embodiment of the invention inasmuch as a resilient means is provided for urging the valve member to a closed position and fluid under pressure is used for hydraulically urging the valve member to an open position.

As in the case of Fig. 1A and the embodiment of Figs. 2A to 2C, fluid under pressure may be conducted downwardly through the tubing-casing annulus for operating the valve means for the flow of both upper and lower zone production from a single flow line 89. In this case, the lower end of the flow line shown in Fig. 3B is connected to a port 106 which is in turn fluidly connected to a port 106 through the housing 67. The removable tool 70 carries seal means 107 for sealing with the inner housing surface above port 88, such that with seal means 77 sealing with the inner wall of the housing beneath ports 101, the port 106 in the housing may be disposed at any point intermediate the aforementioned sealing means to provide a fluid course for fluid under pressure within the annular space 108 between the removable tool and the housing. That is, as can be seen in connection with Figs. 3B and 3C, fluid under pressure conducted downwardly through the flow line 89 will pass through such annular space into the variable capacity pressure chambers for both portions of the valve means.

Reviewing briefly the function of the above-described embodiment, with the removable tool 70 locked in place, as shown in the drawings, lower zone production is conducted upwardly through the tubing and into the housing 67 connected as a part thereof. Such flow from the lower zone is conducted upwardly through the axial passageway 73 through the tool and into the tubing string above the housing 67, from which it is further conducted upwardly to ground level and into the flow wing 16 of Fig. 1. Upper zone production, on the other hand, enters the tubing-casing annulus through ports 15 (Fig. 3D) and is confined to flow into the openings 68 in the housing 67 by means of packing 67a and 14 (Fig. 1A) disposed above and below these ports, the lower of these packings being also disposed above the ports 11 communicating with lower zone production. From the openings 68, upper zone production flows upwardly through the annular passageway 75 and out ports 100 and openings 69 back into the tubing-casing annulus above the uppermost packer. Of course, from the annulus upper zone production flows upwardly to ground level and out through the flow wing 17 of Fig. 1.

The embodiment of Figs. 4A and 4B is in many respects similar to that of Fig. 1B and Figs. 3A to 3D and, for that reason, Figs. 4A and 4B illustrate only the differences between these two embodiments, the remainder of the Figs. 4A and 4B embodiment being similar to the schematic views of the Fig. 1B embodiment and the Fig. 1C embodiment to be described. Thus, there is provided a housing 109 connected at opposite ends to the tubing string and packed off intermediate the casing ports communicating with the upper and lower production zones by means of a packer 14 and above the afore-mentioned ports communicating with the upper zone by packer 67a, in a manner shown in Fig. 1C. As in the other embodiments, lower zone production flows through the tubing string and upper zone production into and through the tubing-casing annulus.

The housing 109 is provided with an upper opening 109a therethrough, as shown in Fig. 4A, and a lower opening 68 (Fig. 1C) therethrough disposed between upper packer 67a and the lower packer 14. In this manner, with the removable tool 110 locked in position within the housing 109, as shown in Figs. 4A and 4B, and suitably sealed off with respect to the inner wall of the housing above the upper opening 109a and below the lower opening 68, there is provided an annular passageway 111 which is defined at least in part between the inner housing wall and the removable tool. Also, of course, this passageway communicates with the upper and lower openings in the housing above and below, respectively, packer 67a such that the flow of upper zone production is by-passed around the packer through such annular passageway 111. In addition, again as in the above-described embodiments, the removable tool 110 is made up principally of a tubular member 112 having an axial passageway 113 extending therethrough for the flow of lower zone production.

The valve means for upper and lower zone production of the embodiment of Figs. 4A and 4B differs from that of Fig. 1B and Figs. 3A to 3D principally in the fact that the valve members are interconnected, and that both parts of the valve means are operable by a single pressure responsive means.

Referring to Fig. 4A, it can be seen that the head 114 of the valve means 115 for controlling the flow of lower zone production is threadedly connected to the upper end of tubular valve member 116 for controlling the flow of upper zone production. More specifically, the valve means 115 comprises a tubular body portion 117 having a central flow passage therethrough communicating with flow ports 118 through said tubular member above the valve head 114 and annular seat 119. In the position shown, of course, the valve means 115 is open to flow of lower zone production through the axial passageway 113. However, upon upward movement of the body portion 117, seat 119 engages the sealing surface of the casing portion of tubular member 112 of the removable tool, which sealing surface is defined by O-ring 120.

With respect to the rest of the valve means 115, it can be seen from Fig. 4A that the tubular body portion 117 is provided with a pressure responsive means 121 facing oppositely to similar means 122 secured to tubular member 112 so as to define a variable capacity pressure chamber 123 therebetween. Still further, ports 124 through the tubular member 112 connect the chamber 123 with an annular space between the removable tool 110 and housing which communicates with a flow line 125 extending downwardly through the tubing-casing annulus by a port 126 through the housing and a header 127. A compression coil spring 128 disposed between the upper end of pressure responsive means 122 and a shoulder 129 secured to tubular body portion 117 provides the valve means 115 with the characteristics previously mentioned in connection with the earlier-described embodiments of this invention.

The tubular valve member 116 for controlling the flow of upper zone production through annular passageway 111 is provided with ports 130 therethrough communicating its central passageway with the annular space between the interconnection of the valve members 115 and 116 and the tubular member 112. It will be noted from Fig. 4A that the ports 130 are disposed above O-rings 131 which provide a sliding seal between valve member 116 and the tubular member 112. Thus, lower zone production flows upwardly through the axial passageway 113 into the central flow passage aforementioned through valve member 116 and out the ports 130 into the annular space. From this annular space, flow of lower zone production continues through the ports or openings 118 in the tubular body portion 117 of the valve means 115 and further upwardly into the axial passageway 113 and the upper portion of the tubing string. In the closed position of the valve means, the surfaces 119 and 120 are sealed with respect to one another, such that even though flow may continue upwardly through the ports 130 it is stopped within the afore-mentioned annular space.

The tubular valve member 116 is provided at its lower end with a seat 132 adapted to sealingly engage with an oppositely facing seat 133 on the tubular member 112 in the closed position of the valve means. It is noted that this seat portion of the valve means is movable within the annular passage 111 for opening or closing the same to the flow of upper zone production therethrough. A sliding seal in the form of O-ring 134 is provided between the lowermost end of the valve member 116 and tubular member 112. Similarly to the embodiment of Fig. 1B and Figs. 3A to 3D, part of the annular passageway 111 extends between concentrically arranged portions 112 and 116 of the removable tool. Thus, openings 135 (Fig. 4B) and 136 (Fig. 4A) are provided through the tubular member 112 for by-passing the packing element 136a. Packing elements 136b are sealably engageable between the removable tool and inner housing wall above housing openings 109a to define with O-ring 131 the upper end of annular passageway 111. As previously mentioned, similar packing means 76 (Fig. 1C) are carried between the removable tool and the inner housing wall beneath the lower housing openings for defining with O-ring 134 the remainder end of such passageway.

It should be noted further that this apparatus makes allowance for the fact that if the seating surfaces for the interconnected valve means 115 and 116 both had a metal-to-metal contact, they might not seat. Thus, the sealing relation of surfaces 119 and O-ring 120 extends over a relatively wide range such that these surfaces as well as metal-to-metal seats 132 and 133 can be seated and sealed with respect to one another despite changes in the length of the connections therebetween.

It will be appreciated that although this last-described embodiment of the invention provides a simplified construction, it does not permit many of the varied uses and functions mentioned with respect to the independently operable valve members. Specifically, it is noted that only a single pressure responsive means 121 is required for operating both valve members, and that the flow line 125 and attendant connections are also simplified. Of course, the sealing means 136b defines the lower end of the annular space between the removable tool and housing which fluidly communicates the variable capacity pressure chamber 123 with the flow line 125, and it will be further appreciated that a similar sealing means may be provided between the removable tool and housing to define the upper end of such annular space. Such a sealing means is shown at 107 in Fig. 1C.

The schematic view of Fig. 1C and the detailed sectional view of Fig. 4C illustrates a slight modification of the valve means of the above-described embodiment of this invention. Particularly, in the modified structure, the valve means 138 for controlling the flow of lower zone production is provided with an annular valve seat 139 for metal-to-metal sealing engagement with an oppositely facing seat 140 upon the casing portion of the tubular member 141 of the removable tool. In this case, to provide for the above-mentioned problem of insuring seating of both valve means, the head 143 of the valve member 138 is connected to the tubular valve member 142 by a slip joint 144 which permits a small amount of relative movement therebetween. Thus, with the valve member 142 provided with a seating surface and arrangement similar to that shown at 132 and 133 of Fig. 4B, seats 139 and 140 will engage even though 132 and 133 engage first. The pressure differential across the valve member 142 is sufficient to keep the seating surfaces of such valve members seated despite the slip joint above-described.

The two embodiments of the apparatus shown schematically in Figs. 1D and 1E and partly in detail in Figs. 5A to 5C, 6, and 7 differ from the embodiments previously described in that the valve means for controlling the flow of the upper and lower production zones are disposed in side by side, rather than coaxial, relation within the housing connectable as a part of the tubing. More particularly, this housing is made up of a first tubular part disposable coaxially of the tubing and in which the valve means for controlling the flow of lower zone production is disposed, and a second tubular part extending longitudinally of the first part and adapted to receive the valve means for controlling the flow of the upper zone production. Thus, the passageway through the housing for the flow of upper zone production is disposed in part within both the first and second tubular parts.

In each of the two embodiments to be described, the coaxial housing part as well as the valve means disposable therein for controlling the flow of lower zone production are identical in construction, such that a detailed description of only one is necessary. The two embodiments differ, however, in the construction of the second tubular part and the valve means disposable therein. Specifically, in the embodiment of Fig. 1D and Figs. 5A to 5C, this second tubular part extends from its connection with the first tubular part to the wellhead, which may be constructed similarly to the wellhead shown in Penick et al. Patent No. 2,335,355. Thus, the valve means for controlling the flow of the upper zone production is removable therefrom by wire line or the like separately from the valve means disposable in the first tubular part for controlling the flow of lower zone production. In the embodiment of Fig. 1E and Fig. 7, on the other hand, the second tubular part is of relatively short length and has an opening to the exterior thereof at the subsurface level to permit the flow of upper zone production to pass upwardly into as well as through the tubing-casing annulus. In this latter embodiment of Fig. 7, the valve means for controlling the flow of upper zone production is not removable from the housing.

Referring now in particular to the embodiment of Fig. 1D and Figs. 5A to 5C, the housing 145 comprises a first tubular part 146 having connections at both its upper and lower ends with the upper and lower portions of the tubing string, such that the entire housing 145 is connectable as a part of the tubing 12, and a second tubular part 147 extending in side by side relation to the first and having a connection therewith by means of opening 148 (Fig. 5B). Suitable means, such as welding, may be used for maintaining the substantially parallel relation of the two housing parts.

In Fig. 5C, the lower portion of the part 146 of the housing 145 is shown sealed off with respect to the casing 10 by means of packer 149 which, as shown diagrammatically in the drawings, may be of the "offset" type and is situated above the lower openings 150 in the housing. If desired, the eccentric location of the tubing string within the casing may be accommodated in another manner. For example, a part of the eccentricity may be eliminated by the use of flush joint tubing in both tubular housing parts. The eccentricity may be still further lessened by spacing the upper packer farther beneath the interconnection of the two housing parts.

It will be understood that in this embodiment of the invention, the opening through the upper end of second tubular 147 connecting with the wellhead would correspond to the upper housing opening in the other embodiments previously described. In other words, this opening and lower opening 150 through the housing constitute the opposite end communications of the passageway through the housing for the flow of upper zone production. It will be seen from Fig. 1D that an additional packer 14 is provided between the tubing and casing beneath the housing openings 150 as well as intermediate the upper and lower zone ports 15 and 11. In this manner, the flow of upper zone production is confined to passage from the tubing-casing annulus 13 below packer 149 into lower housing openings 150 through the passageway above-mentioned to ground level, in a manner to be described more fully hereinafter.

As previously mentioned, the valve means for controlling flow from the upper end lower zones are disposable in the two separate housing parts in the embodiments of Fig. 1D and Figs. 5A to 5C. The valve means for controlling the flow of the lower zone production is carried within a tool 152 removably lockable in position within the opening 151, through first housing part 146. The locking part of this tool is indicated only in part at 153 in Fig. 5A and will not be described herein inasmuch as it may correspond to the locking part shown in Fig. 3A which is, as previously mentioned, disclosed in detail in an issued patent. As also mentioned with respect to certain of the earlier-described embodiments of the present invention, this locking device is of a type which permits the locking of removable tool 152 within a substantially full opening through the housing, such that, upon removal of the tool, work-over tools or the like runnable through the tubing may be passed through the housing as is contemplated in permanently completed wells.

The removable tool 152 comprises a tubular member 154 having a flow passage extending axially therethrough and packed off as at 155 (Fig. 5C) within housing part 146 beneath openings 150 so as to define an axial passageway 156 through the housing for the flow of lower zone production. Disposed within this passageway 156 is a valve means 157 which, as can be seen, corresponds very closely to the valve means for controlling the flow of lower zone production in the embodiment of Fig. 1B and Figs. 3A to 3D, and shown in detail in Fig. 3B.

Briefly, and more in the way of summary, this valve means 157 includes a tubular body portion 158 axially slidable within a casing portion of tubular member 154 and having flow ports 159 therethrough connecting with a central flow passage therethrough above annular valve seat 160 and valve head 161. As can be seen from the drawings, valve seat 160 is positioned for sealing engagement with oppositely facing seat 162 on the casing portion of tubular member 154 for closing the passageway 156 to flow therethrough upon upward movement of the valve member 157.

Further, the tubular body portion 158 of the valve member is provided with pressure responsive means 163 facing oppositely to similar means 164 upon the casing portion of the tubular member 154 so as to define a variable capacity pressure chamber 165 therebetween. A port 166 connects the chamber 165 with the exterior of the removable tool to permit the hydraulic actuation of the valve means, in a manner to be described hereinafter. Also, a compression coil spring 167 is disposed between the upper end of pressure responsive means 164 and a shoulder 168 affixed to tubular body portion 158 of the valve member such that the valve member is resiliently urged toward closed position, as in the case of the valve members of the previously described embodiments. Further discussion of the construction and operation of valve member 157 is not thought necessary in view of the earlier portions of this specification. It is sufficient to note, in general, that such valve member operates to open and close the axial passageway 156 for controlling the flow of lower zone production therethrough.

In addition to the packing means 155, shown in Fig. 5C, the removable tool 152 is packed off within the opening 151 through housing part 146 by sealing means 169 at a position above opening 148 which, as previously mentioned, connects the tubular part 146 with the second tubular part 147. More particularly, this opening 148 connects the opening 151 through part 146 with the flow passage 170 through the tubular part 147, which preferably extends from said opening 148 to ground level. Thus, there is defined, between removable tool 152 and opening 151, the lower annular portion 171 of a passageway which connects lower housing openings 150 with upper housing opening through the upper end of tubular part 147 for the flow of upper zone production. More specifically, the upper and lower ends of the passageway portion 171 are defined, respectively, by packing means 169 and 155. Thus, the flow of upper zone production is caused to pass upwardly through passageway portion 171, into opening 148 and the flow passage 170 through tubular part 147.

Tool 172 is removably lockable within the tubular part 147 and comprises a tubular member 173 having a central flow passage therethrough which defines another portion 174 of the passageway for the flow of upper zone production through the housing. This tubular member 173 is packed off at 175 and 176 (Fig. 5B) within the flow passage 170 so as to confine the flow through passageway portion 174, as mentioned above. The packing 175 may be carried by a locking device, indicated in general by the reference character 177 at the upper end of tool 172.

The locking device 177 may differ from that previously described in connection with the other embodiments in that the locking device for tool 172 need not necessarily be of a type lockable within a housing or tubular member having a substantially full opening. That is, this locking device may be of a type cooperable within a landing nipple having shoulders or other projections into the opening therethrough. In other words, the substantially full opening through the housing required for permanent completion purposes is provided through the first tubular part 145 and the locking device 177 need only be of a type which permits the tool 172 to be selectively locked within or removed from tubular part 147. A detailed description of the construction and operation of the locking device 177 may be found on page 18 of the 1953–54 Catalog of Otis Pressure Control, Inc. of Dallas, Texas. This device is known as the "Type J" Otis Removable Mandrel Assembly and, in view of the afore-mentioned detailed description, further discussion is not required herein, it being understood further that equivalent locking means may be used.

Carried within the tubular member 173 of removable tool 172 is a valve means 178 for controlling the flow of upper zone production through the passageway portion 174. This valve means may correspond in all respects to the valve means 157 within tool 145 such that a detailed discussion thereof is unnecessary.

It is well to note, however, that the variable capacity pressure chamber 179 between pressure responsive means 180 carried by the tubular body portion 181 of the valve means and pressure responsive means 182 on the casing portion of tubular member 173 is fluidly connected with the exterior of the removable tool 172 by ports 183. As can be seen from Fig. 5B in conjunction with Fig. 6, opening 184 through tubular part 147 connects with an opening 185 through tubular part 146 so as to provide a fluid communication between the annular space between removable tool 152 and housing part 146 and the annular space between removable tool 172 and housing part 147. Thus, with packings 186 carried by tubular member 154 above ports 166 and openings 185 and with packings 169 carried below such ports and openings, and further with packing elements 175 and 176 carried by tubular member 173 above and below, respectively, ports 183 and openings 184, there is a common space fluidly connecting the variable capacity chambers 165 and 179 of valve members 157 and 178, respectively.

As indicated in Fig. 6, a single flow line 187 may be extended downwardly in the annulus 13 for connection through opening 188 in tubular part 146 with this common space for operating the valve means for controlling the flow of both the upper and the lower production zones. Of course, as previously mentioned, such an arrangement is not the only one possible and, if desired, separate flow lines and communications to the variable capacity chambers of each of the valve members may be provided.

Referring now to the embodiment of Figs. 1E and 7, it will be understood that the lower portion of the housing 189, and particularly the coaxial tubular part 190 thereof, may correspond to that described in connection with the embodiment of Fig. 1D and Figs. 5A to 5C and particularly shown in Fig. 5C. A second tubular housing part 191 is carried in side by side relation to the first housing part and is provided with a flow passage 192 therethrough connecting with the opening 193 through first tubular part 190 by means of an opening 194. The tool 195 removably locked within housing part 190 may correspond in all respects to the removable tool 152 of the embodiment of Fig. 1D and Figs. 5A to 5C and, for this purpose, there is shown in Fig. 7 in broken lines the outline of the basic elements of a valve member 196 for controlling the flow of lower zone production through an axial passageway 197 through the tool and housing. As in the case of the embodiment of Fig. 1D and Figs. 5A to 5C, the flow of lower zone production is upwardly through passageway 197 such that it may be controlled by means of valve member 196 movable within such passageway.

Referring now to the second tubular part 191 and the valve means 198 disposable within the flow passage 192 therethrough for controlling the flow of upper zone production, it can be seen that upper housing openings 199 are provided through part 191 toward the upper end thereof, such that these openings along with openings 150 (Fig. 1E) provide the opposite extremities of the passageway for flow of upper zone production. More particularly, there is provided a lower annular portion 200 of this passageway disposed between the removable tool 152 and the housing part 190 which is defined at its lower end by a packer 155 and at its upper end by a packing 201 carried by the removable tool in a position similar to packing 169 of Fig. 5B. The flow passage 192 through the housing part 191 provides the upper portion of this passageway, which upper portion is connected to lower portion 200 by means of the opening 194. It is obvious that the flow of upper zone production through openings 199 is upwardly into and through the tubing-casing annulus to the wellhead.

The valve member 198 for controlling the flow of upper zone production is similar in construction to the valve member 178 of the embodiment of Fig. 1D and Figs. 5A to 5C. However, valve member 198 is not removable from its operating position within a casing portion of the housing part 191. Thus, there is formed between pressure responsive means 202 on the tubular body member 203 and a similar but oppositely facing pressure responsive means 204 on the tubular housing part 191 a variable capacity pressure chamber 205. It will be understood, of course, that a central flow passage as well as side openings 207 are provided through body member 203 for the flow of upper zone production therethrough in the open position of the valve member shown in Fig. 7.

Also, ports 206 through the casing portion of tubular housing part 191 provide a communication between the variable capacity pressure chamber 205 for valve member 198 and a similar chamber for valve member 196 which corresponds to that shown in Fig. 5B. Such communication is provided, as shown in Fig. 7, by an opening 208 through a boss welded to housing part 190, an opening 209 through housing part 190, and ports 210 through removable tool 195 connecting the afore-mentioned pressure chamber for valve member 196. Thus, it will be further understood that this embodiment could be provided with a single flow line, as shown in Fig. 6, such that a cross-sectional view through the pressure chambers for the valve members 196 and 198 would at least approximately correspond to that shown in Fig. 6.

Referring now to the control system for operating the previously described subsurface valve means of the present invention, it can be seen that the flow line, designated in Fig. 1 by reference character "F" to represent the flow line of any one of the foregoing embodiments, extends upwardly through the tubing-casing annulus 13 to the wellhead above ground level and outwardly of the well through the lower flange of a fitting at the well head. Of course, two or more such lines may be extended downwardly into the well to the subsurface level for independently controlling the valve means for the upper and lower zone productions, in a manner previously mentioned.

The upper end of flow line "F" is connected to a surge or volume tank, shown diagrammatically in Fig. 1 and designated by the numeral 211, which contains a control fluid under any desired pressure. Preferably, the flow line is filled with a liquid rather than a gas so as to obtain a quicker hydraulic reaction. Basically then, the opening and closing of the subsurface valve means is controlled by the increase or decrease in pressure of the control fluid within the flow line "F."

While the source 211 is shown adjacent the wellhead, such is not necessarily the case and a similar source may be disposed at a point even more remote from the subsurface level of the well with the flow line "F" extended to such remote point. Preferably, a flow bean 212, shown in the blow-up of Fig. 1, is disposed within the flow line "F" between the source of control fluid 211 and the subsurface valve means for insuring an even and uniform distribution of pressure therebetween.

According to one novel concept of this invention, the opening and closing of the subsurface valve means for controlling the flow from the upper and lower production zones is automatically responsive to a predetermined change in pressure conditions within the well above such subsurface level. Thus, there is provided a system wherein pressure responsive control means are interposed between the source of control fluid 211 and one or both of the lower or upper zone production fluid within the tubing 12 and the tubing-casing annulus 13, respectively. More particularly, the control system connected between the flow wings 16 and 17 provides a means for automatically shutting off one or both of said valve members for upper and lower zone production in response to a predetermined pressure condition within the tubing and annulus of the well above the subsurface level in which the valve means are disposed.

The purpose of such apparatus is to provide a subsurface control over flow from the production zones responsive to damage or destruction of the well equipment above such subsurface level which damage or destruction will, of course, reduce the pressure within the well. In this connection, it will be understood that such a control system may be responsive to a predetermined pressure change in the tubing-casing annulus 13, in the tubing 12, or, still further, responsive to a pressure change within either of such conduits, as is the case in the embodiment shown in Fig. 1. It will be understood also that although the particular control system shown is responsive to a drop in pressure within the well, a similar system may be devised for an increase in pressure or for either a drop or increase in pressure below or above a predetermined amount.

Referring to Fig. 1, there is shown a flow line 213 extending between the flow wing 16 and the source of fluid under pressure 211, and another flow line 214 extending between the flow wing 17 and the same source. As indicated diagrammatically, each of said lines may be provided with suitable valve control, such that, for example, only one or the other of said control systems may be used at one time. Interposed within the flow lines 213 and 214 between the flow wings 16 and 17, respectively, and the source 211 are relatively large flow beans shown in the blow-ups designated by reference characters 215a.

The control element itself is provided in each case by a pilot valve 215 having a low pressure type pilot 216 connected thereto which may comprise, respectively, an Otis Type "M" pilot valve and a Type "B" low-pressure pilot. The function and preferred construction of each of the valves and pilots are clearly set forth on pages 11, 12 and 13 of the aforementioned 1953–54 Catalog of Otis Pressure Control, Inc. It is sufficient to note that the main function of the valves 215 is to provide a control responsive to the pressure of fluid within the flow wing to which it is connected, and which in turn is connected to either the tubing or the tubing-casing annulus, for exhausting the control fluid within the source 211 when the pressure of such controlled fluid within the well reaches a predetermined figure. More specifically, when the well equipment above the subsurface level of the valve means previously described is damaged or destroyed such that the pressure of the fluid within the well drops a predetermined amount, a pressure responsive member within the pilot valve 215 is operable to actuate the low pressure pilot 216 in a manner to exhaust fluid within the source 211 connected to such valve. In turn, this drop of pressure of the control fluid permits a closing of the subsurface valve means. That is, as will be clearly understood from the earlier description of the characteristics of the valve means employed in each embodiment, the pressure of the control fluid is operable in one instance to hold the valve means in an open position to permit flow from the production zone controlled thereby, while a reduction in such pressure permits the resilient means of the valve member to overcome the pressure of the control fluid and close the valve member. It will also be understood that a pressurizing of the fluid within the source 211 will enable reopening of the valve means.

In connection with the language employed in the claims of this application, it will be understood that any control responsive to a predetermined pressure change within the well refers broadly to such a change in the tubing alone, the tubing-casing annulus alone, or in either the tubing and tubing-casing annulus.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. For use in a two-zone well having a tubing packed off within a casing intermediate said zones to produce the lower zone through the tubing and the upper zone through the tubing-casing annulus, the improvement comprising: a tubular housing connected in the tubing as a part thereof, a packer packing off between said housing and the casing above said upper zone at a sub-surface level within the well, said tubular housing having openings therethrough above and below said packer, a tubular member concentrically disposed within the tubular housing, means sealing between said tubular housing and said tubular member above the upper of said openings and below the lower of said openings to provide a first passageway through said tubular member for lower zone production and a second passageway for upper zone production between said tubular member and said housing, valve means in said first passageway for controlling lower zone production, and means removably positioning and permitting removal of said concentrically disposed tubular member from said housing to permit the passage of well tools therethrough.

2. Apparatus for controlling flow within a well having a well head and upper and lower production zones, comprising: a casing string in said well, a tubing string within said casing string, a tubular member connected in said tubing string, a packer packing off between said tubular member intermediate its ends and said casing string, said tubular member having a fluid flow passage therethrough and openings connecting said passage with the exterior of the tubular member above and below said packer, means forming a third opening through said tubular member above said other openings, and a flow conduit extending from said well head lengthwise of the exterior of said tubular member to and having a fluid connection with said third opening.

3. Apparatus for controlling flow within a well having a well head and upper and lower production zones comprising a well casing string, a tubing string in said casing string extending from said well head down below said upper zone, a first packer packing off between said tubing string and said casing string above said upper zone, a second packer packing off between said tubing string and said casing string between said upper and lower zones, a tubular member disposed within said tubing string, means forming a first flow passage through said tubular member to communicate the interior of said tubing string above and below said tubular member, and means forming a second flow passage between said tubular member and said tubing string communicating with the exterior of said tubing string above and below said first packer.

4. Apparatus for controlling flow within a well having a well head and upper and lower production zones comprising a well casing string, a tubing string in said casing string extending from said well head down below said upper zone, a first packer packing off between said tubing string and said casing string above said upper zone, a second packer packing off between said tubing string and said casing string between said upper and lower zones, tubular means disposed in said tubing string adjacent said first packer, means sealing opposite ends of said tubular means to said tubing string above and below said first packer, said tubular means forming a first flow passage therethrough communicating the interiors of said tubing string above and below said tubular means, means forming a second flow passage at least partially between said tubular means and said tubing string communicating the exteriors of said tubing string above and below said first packer, valve means disposed within each flow passage in said tubular means for opening and closing said passages to flow therethrough, and means for operating said valve means from said well head.

5. Apparatus for controlling flow within a well having a well head and upper and lower production zones comprising a well casing string, a tubing string in said casing string extending from said well head down below said upper zone, a first packer packing off between said tubing string and said casing string above said upper zone, a second packer packing off between said tubing string and said casing string between said upper and lower zones, tubular means disposed in said tubing string, said tubular means forming a first flow passage therethrough communicating the interior of said tubing string above and below said tubular means, means forming a second flow passage at least partially between said tubular means and said tubing string communicating the exterior of said tubing string above and below said first packer, value means disposed within each flow passage in said tubular means for opening and closing said passages to flow therethrough, fluid pressure actuated valve operator means connected to said valve means, and a fluid conduit connected to said fluid pressure actuated valve operator means and extending to said well head.

6. Apparatus for controlling flow within a well having a well head and upper and lower production zones, comprising: a well casing string, a tubing string in said casing string extending from said well head down below said upper zone, a first packer packing off between said tubing string and said casing string above said upper zone, a second packer packing off between said tubing string and said casing string between said upper and lower zones, tubular means movable through said tubing string, means releasably locking said tubular means against movement in said tubing string, means sealing opposite ends of said tubular means to said tubing string above and below said first packer, said tubular means forming a first flow passage therethrough communicating the interior of said tubing string above and below said tubular means, means forming a second flow passage at least partially between said tubular means and said tubing string communicating the exterior of said tubing string above and below said first packer, valve means disposed within each flow passage in said tubular means for opening and closing said passages to flow therethrough, fluid pressure actuated valve operator means connected to said valve means, and a fluid conduit connected to said pressure actuated valve operator means and extending to said well head.

7. A well having a well head and upper and lower production zones, a well casing in said well, a tubing string within said casing and extending from below said upper production zone to said well head, a first packer packing off between the tubing string and casing above said upper production zone, a second packer packing off between the tubing string and casing between said production zones, means including said tubing string forming a first fluid flow path from below said tubing string and completely therethrough to said well head, said tubing string having lateral openings therethrough above and below said first packer, means forming a second fluid flow passage within said tubing string between said openings, a valve seat formed in said first flow passage, valve means in said tubing string having a portion removably seatable with said valve seat, said valve means being movable between a first position wherein said valve portion is seated upon said valve seat and a second position wherein said valve portion is unseated from said valve seat, spring means resiliently biasing said valve means to its first position, fluid pressure actuated means operatively associated with said valve means for moving said valve means from its first position to its second position against the bias of said spring means upon the presence of a predetermined fluid pressure within said pressure actuated means, a source of fluid under pressure at said well head, and a fluid conduit connecting said fluid pressure source and said fluid pressure actuated means.

8. In a system as set forth in claim 7 and further including means for removably positioning and allowing removal of said valve means portion from said first fluid flow passage to permit passage of well tools therethrough.

9. A well having a well head and upper and lower production zones, a well casing in said well, a tubing string within said casing and extending from below said upper production zone to said well head, a first packer packing off between the tubing string and casing above said upper production zone, a second packer packing off between the tubing string and casing between said production zones, means including said tubing string forming a first fluid flow path from below said tubing string and extending completely therethrough to said well head, said tubing string having lateral openings therethrough above and below said first packer, means forming a second fluid flow passage within said tubing string between said openings, a first valve seat formed in said first flow passage, a second valve seat formed in said second flow passage, valve means in said tubing string having a first portion removably seatable with said first valve seat and a second portion removably seatable with said second valve seat, said valve means being movable between a first position wherein said valve portions are seated upon said valve seats and a second position wherein said valve portions are unseated from said valve seats, fluid pressure actuated means operatively associated with said valve means for moving said valve means from its first position to its second position upon the presence of a predetermined fluid pressure within said pressure actuated means, a source of fluid under pressure at said well head, and a fluid conduit connecting said fluid pressure source and said pressure actuated means.

10. In a system as set forth in claim 9 and further including means for removably positioning and allowing removal of said first valve means portion from said first fluid flow passage to permit passage of well tools therethrough.

11. A well having a well head and upper and lower production zones, a well casing in said well, a tubing string within said casing and extending from below said upper production zone to said well head, a first packer packing off between the tubing string and casing above said upper production zone, a second packer packing off between the tubing string and casing between said production zones, means forming a first lateral opening through said tubing string above said first packer, means forming a second lateral opening through said tubing string between said first and second packers, means including said tubing string forming a first fluid flow path from below said tubing string and extending completely therethrough to said well head, means forming a second fluid flow passage within said tubing string between said first and second openings, a valve seat formed in said first flow passage, valve means in said tubing string having a portion removably seatable with said valve seat, said valve means being movable between a first position wherein said valve portion is seated upon said valve seat and a second position wherein said valve portion is unseated from said valve seat, spring means resiliently biasing said valve means to its first position, fluid pressure actuated means operatively associated with said valve means for moving said valve means from its first position to its second position against the bias of said spring means upon the presence of a predetermined fluid pressure within said pressure actuated means, a source of fluid under pressure at said well head, a fluid conduit connecting said fluid pressure source and said fluid pressure actuated means, and control means responsive to a predetermined change in well fluid pressure at said well head for exhausting said fluid conduit.

12. A well having a well head and upper and lower production zones, a well casing in said well, a tubing string within said casing and extending from below said upper production zone to said well head, a first packer packing off between the tubing string and casing above said upper production zone, a second packer packing off between the tubing string and casing between said production zones, means forming a first lateral opening through said tubing string above said first packer, means forming a second lateral opening through said tubing string between said first and second packers, means forming a first fluid flow path from below said tubing string and completely therethrough to said well head, means forming a second fluid flow passage within said tubing string between said first and second openings, a first valve seat formed in said first flow passage, a second valve seat formed in said second flow passage, valve means disposed in said tubing string and having a first portion removably seatable with said first valve seat and a second portion removably seatable with said second valve seat, said valve means being movable between a first position wherein said valve portions are seated upon said valve seats and a second position wherein said valve portions are unseated from said valve seats, spring means resiliently biasing said valve means to its first position, fluid pressure actuated means operatively associated with said valve means for moving said valve means from its first position to its second position against the bias of said spring means upon the presence of a predetermined fluid pressure within said pressure actuated means, a source of fluid under pressure at said well head, and a fluid conduit connecting said fluid pressure source and said pressure actuated means.

13. A well having a well head and upper and lower production zones, a well casing in said well, a tubing string within said casing and extending from below said upper production zone to said well head, a first packer packing off between the tubing string and casing above said upper production zone, a second packer packing off between the tubing string and casing between said production zones, means forming a first opening through said tubing string above said first packer, means forming a second opening through said tubing string between said first and second packers, means including said tubing string forming a first fluid flow passage from below said tubing string and completely therethrough to said well head, means forming a second fluid flow passage within said tubing string between said first and second openings, a first valve seat formed in said first flow passage, a second valve seat formed in said second flow passage, valve means disposed in said tubing string and having a first portion removably seatable with said first valve seat and a second portion removably seatable with said second valve seat, said valve means being movable between a first position wherein said valve portions are seated upon said valve seats and a second position wherein said valve portions are unseated from said valve seats, spring means rsiliently biasing said valve means to its first position, fluid pressure actuated means operatively associated with said valve means for moving said valve means from its first position to its second position against the bias of said spring means upon the presence of a predetermined fluid pressure within said pressure actuated means, a source of fluid under pressure at said well head, a fluid conduit connecting said fluid pressure source and said pressure actuated means, and control means responsive to a predetermined change in well fluid pressure at said well head for exhausting said fluid conduit.

14. In a system as set forth in claim 13 and further including means for removably positioning and allowing removal of said first valve means portion from said first fluid flow passage to permit passage of well tools therethrough.

15. A well having a well head and upper and lower production zones, a well casing in said well, a tubing string within said casing extending from said well head down to below said upper production zone, a first packer packing off between the tubing string and casing above said upper production zone, a second packer packing off between the tubing string and casing between said upper and lower production zones, a tubular valve assembly disposed in said tubing string adjacent said first packer, said tubing string and valve assembly forming a first fluid flow passage from below said tubing string to said well head, means forming openings through said tubing string above and below said first packer, the opening below said first packer being above said second packer, means forming with said tubing string a second fluid flow passage within said tubing string between said tubing string openings and separate from said first fluid flow passage, a valve seat within said valve assembly in said first fluid flow passage, a valve means having a valve portion removably seatable with said valve seat, said valve means being movable between a first position wherein said valve portion is seated on said valve seat and a second position wherein said valve portion is unseated from said valve seat, fluid pressure actuated means operatively associated with said valve portion for moving said valve portion from its first to its second position upon the presence of a predetermined fluid pressure within said fluid pressure actuated means, a source of fluid under pressure at said well head, and a conduit fluidly connecting said fluid pressure source to said fluid pressure actuated means.

16. A well having a well head and upper and lower production zones, a well casing in said well, a tubing string within said casing extending from said well head down to below said upper production zone, a first packer packing off between the tubing string and casing above said upper production zone, a second packer packing off between the tubing string and casing between said upper and lower production zones, a tubular valve assembly movable as a unit through said tubing string, means releasably locking said valve assembly in said tubing string adjacent said first packer, said tubing string and said valve assembly forming a first fluid flow passage from below said tubing string to said well head, means forming openings through said tubing string above and below said first packer, the opening below said first packer being above said second packer, means forming with said tubing string a second fluid flow passage within said tubing string between said tubing string openings separate from and annularly of said first fluid flow passage, a first valve seat within said valve assembly in said first fluid flow passage, a second valve seat within said valve assembly in said second fluid flow passage, a valve means having a first valve portion removably seatable with said first valve seat and a second valve portion seatable with said second valve seat, said valve means being movable between a first position wherein both valve portions are seated on said valve seats and a second position wherein both valve portions are unseated from said valve seats.

17. A well having a well head and upper and lower production zones, a well casing in said well, a tubing string within said casing extending from said well head down to below said upper production zone, a first packer packing off between the tubing string and casing above said upper production zone, a second packer packing off between the tubing string and casing between said upper and lower production zones, a tubular valve assembly movable as a unit through said tubing string, means releasably locking said valve assembly in said tubing string adjacent said first packer, said tubing string and valve assembly forming a first fluid flow passage from below said tubing string to said well head, means forming openings through said tubing string above and below said first packer, the opening below said first packer being above said second packer, means forming with said valve assembly and said tubing string a second fluid flow passage within said tubing string between said tubing string openings separate from said first fluid flow passage, the annulus between the tubing string and casing extending said second fluid flow passage outside of said tubing string above said first packer to said well head, a valve seat within said valve assembly in said first fluid flow passage, a valve member removably seatable with said valve seat, said valve member being movable between a first position wherein said valve member is seated on said valve seat and a second position wherein said valve member is unseated from said valve seat, fluid pressure actuated means operatively associated with said valve member for moving said valve member from its first to its second position upon the presence of a predetermined fluid pressure within said fluid pressure actuated means, a source of fluid under pressure at said well head, and a conduit fluidly connecting said fluid pressure source to said fluid pressure actuated means.

18. A well having a well head and upper and lower production zones, a well casing in said well, a tubing string within said casing extending from said well head down to below said upper production zone, a first packer packing off between the tubing string and casing above said upper production zone, a second packer packing off between the tubing string and casing between said upper and lower production zones, a tubular valve assembly movable as a unit through said tubing string, means releasably locking said valve assembly in said tubing string adjacent said first packer, said tubing string and valve assembly forming a first fluid flow passage from below said tubing string to said well head, means forming openings through said tubing string above and below said first packer, the opening below said first packer being above said second packer, means forming a second fluid flow passage within said tubing string between said tubing string openings separate from and annularly of said first fluid flow passage, a first valve seat within said valve assembly in said first fluid flow passage, a second valve seat within said valve assembly in said second fluid flow passage, a valve means having a first valve portion removably seatable with said first valve seat and a second valve portion seatable with said second valve seat, fluid pressure actuated means operatively associated with both of said valve portions for unseating said valve portions from their valve seats upon the presence of a predetermined fluid pressure within said fluid pressure actuated means, a source of fluid under pressure at said well head, a conduit fluidly connecting said fluid pressure source to said fluid pressure actuated means, and control means responsive to a predetermined change in well fluid pressure at said well head for exhausting said conduit.

19. A well having a well head and upper and lower production zones, a well casing in said well, a tubing string within said casing extending from said well head down to below said upper production zone, a first packer packing off between the tubing string and casing above said upper production zone, a second packer packing off between the tubing string and casing between said upper and lower production zones, a tubular valve assembly movable as a unit through said tubing string, means releasably locking said valve assembly in said tubing string adjacent said first packer, said tubing string and valve assembly forming a first fluid flow passage from below said tubing string to said well head, means forming openings through said tubing string above and below said first packer, the opening below said first packer being above said second packer, means forming with said valve assembly and said tubing string a second fluid flow passage within said tubing string between said tubing string openings separate from said first fluid flow passage, the annulus between the tubing string and casing extending said second fluid flow passage outside of said tubing string from above said first packer to said well head, a first valve seat within said valve assembly in said first fluid flow passage, a second valve seat in said second fluid flow passage, a valve means having a first valve portion removably seatable with said first valve seat and a second valve portion removably seatable with said second valve seat, said valve means being movable between a first position wherein both valve portions are seated on said valve seats and a second position wherein both valve portions are unseated from said valve seats, fluid pressure actuated means operatively associated with both of said valve portions for moving both of said valve portions from their first to their second positions upon the presence of a predetermined fluid pressure within said fluid pressure actuated means, a source of fluid under pressure at said well head, and a conduit fluidly connecting said fluid pressure source to said fluid pressure actuated means.

20. A well having a well head and upper and lower production zones, a well casing in said well, a tubing string within said casing extending from said well head down to below said upper production zone, a first packer packing off between the tubing string and casing above said upper production zone, a second packer packing off between the tubing string and casing between said upper and lower production zones, a tubular valve assembly movable as a unit through said tubing string, means releasably locking said valve assembly in said tubing string adjacent said first packer, said tubing string and valve assembly forming a first fluid flow passage from below said tubing string to said well head, means forming openings through said tubing string above and below said first packer, the opening below said first packer being above said second packer, means forming with said valve assembly and said tubing string a second fluid flow pasage within said tubing string between said tubing string openings separate from and annularly of said first fluid flow passage, the annulus between the tubing string and casing extending said second fluid flow passage outside of said tubing string above said first packer to said well head, a first valve seat within said valve assembly in said first fluid flow passage, a second valve seat within said valve assembly in said second fluid flow passage, a valve means having a first valve portion removably seatable with said first valve seat and a second valve portion removably seatable with said second valve seat, said valve means being movable between a first position wherein both valve portions are seated on said valve seats and a second position wherein both valve portions are unseated from said valve seats, spring means resiliently biasing said valve means to its first position, fluid pressure actuated means operatively associated with both of said valve portions for moving both of said valve portions simultaneously from their first to their second positions against the bias of said spring means upon the presence of a predetermined fluid pressure within said fluid pressure actuated means, a source of fluid under pressure at said well head, a conduit fluidly connecting said fluid pressure source to said fluid pressure actuated means, and control means responsive to a predetermined change in well fluid pressure at said well head for exhausting said conduit.

21. A valve for disposal within a well conduit comprising an elongated tubular body member, a tubular valve member coaxially disposed in said body member and spaced therefrom and axially movable relative thereto between first and second positions, annular means on said body member in sliding and fluid excluding relationship to said valve member and annular means on said valve member in sliding and fluid excluding relationship to said body member to provide a variable capacity chamber therebetween so that fluid under pressure in said chamber will urge said valve member to its second position, said tubular body member having an opening into said chamber whereby fluid under pressure may be introduced thereinto, said body member having first and second longitudinally spaced lateral openings therethrough into said annular flow space and interengageable annular sealing means fixed to said valve member and said body member between said openings for interengagement with each other to seal against flow between said openings when said valve member is in its first position, and means slidably sealing between said tubular body member and said valve member at longitudinally spaced apart points to form an annular flow space therebetween sealed at each end.

22. A valve as set forth in claim 21 wherein said tubular body member is provided with an axial flow passage therethrough, and further including a valve means to close said axial flow passage when said tubular valve member is in its first position and to open said axial flow passage when said tubular valve member is in its second position.

23. A valve for disposal within a well conduit comprising an elongated tubular body member, a tubular valve member coaxially disposed in said body member and spaced therefrom and axially movable relative thereto between first and second positions, spring means resiliently biasing said valve member to its first position, annular means on said body member in sliding and fluid excluding relationship to said valve member and annular means on said valve member in sliding and fluid excluding relationship to said body member to provide a variable capacity chamber therebetween so that fluid under pressure in said chamber will urge said valve member to its second position against the bias of said spring means, said tubular body member having an opening therethrough into said chamber whereby fluid under pressure may be introduced thereinto, annular means slidably sealing between said valve member and said body member at spaced longitudinal points to form an annular passage therebetween sealed at each end, said body member having first and second longitudinally spaced lateral openings therethrough into said annular passage, and interengageable annular sealing means fixed to said valve member and said body member in said annular passage between said openings for sealing flow between said openings when said valve member is in its first position and for allowing flow between said openings when said valve member is in its second position.

24. A valve as set forth in claim 23 wherein annular sealing surfaces are provided on the exterior of said body member on each side of said openings.

25. A valve as set forth in claim 23 wherein said tubular body member is provided with an axial flow passage therethrough, and further including a valve means for opening and closing said axial flow passage upon movement of said tubular valve member between its second and first positions, respectively.

References Cited in the file of this patent

UNITED STATES PATENTS

| | | |
|---|---|---|
| 1,255,147 | Fletcher | Feb. 5, 1918 |
| 1,723,682 | Deming | Aug. 6, 1929 |
| 1,861,332 | Waitz | May 31, 1932 |
| 1,983,854 | Howard et al. | Dec. 11, 1934 |
| 2,033,563 | Wells | May 10, 1936 |
| 2,056,543 | Tschappat | Oct. 6, 1936 |
| 2,227,538 | Dorton | Jan. 7, 1941 |
| 2,277,380 | Yancey | Mar. 24, 1942 |
| 2,335,355 | Penick | Nov. 30, 1943 |
| 2,351,322 | Crake | June 13, 1944 |
| 2,368,428 | Saurenman | Jan. 30, 1945 |
| 2,537,066 | Lewis | Jan. 9, 1951 |
| 2,649,916 | Brown | Aug. 25, 1953 |
| 2,681,705 | Tappmeyer | June 22, 1954 |
| 2,766,013 | Tausch | Jan. 1, 1957 |
| 2,780,290 | Natho | Feb. 5, 1957 |
| 2,780,291 | Westling | Feb. 5, 1957 |
| 2,785,755 | En Dean | Mar. 19, 1957 |
| 2,786,535 | Boer et al. | Mar. 26, 1957 |